United States Patent
Lee et al.

(10) Patent No.: US 10,324,318 B2
(45) Date of Patent: Jun. 18, 2019

(54) CURVED LIQUID CRYSTAL DISPLAY PANEL AND CURVED DISPLAY DEVICE HAVING THE SAME

(71) Applicant: Samsung Display Co., LTD., Yongin, Gyeonggi-Do (KR)

(72) Inventors: Cheong-Hun Lee, Asan-si (KR); Jeong-Man Son, Suwon-si (KR); Dong-Wook Kim, Asan-si (KR); Byong-Wook Ahn, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 1057 days.

(21) Appl. No.: 13/686,722

(22) Filed: Nov. 27, 2012

(65) Prior Publication Data

US 2014/0055696 A1    Feb. 27, 2014

(30) Foreign Application Priority Data

Aug. 22, 2012   (KR) .................. 10-2012-0091787

(51) Int. Cl.
  *G02F 1/13*   (2006.01)
  *G02F 1/1333*   (2006.01)
  *G02F 1/1362*   (2006.01)

(52) U.S. Cl.
  CPC ........ *G02F 1/132* (2013.01); *G02F 1/133305* (2013.01); *G02F 1/133382* (2013.01); *G02F 1/136286* (2013.01); *G02F 2201/54* (2013.01); *G02F 2201/56* (2013.01)

(58) Field of Classification Search
  CPC .............. G02F 1/132; G02F 1/133305; G02F 1/133382; G02F 1/136286; G02F 2201/54; G02F 2201/56
  See application file for complete search history.

(56) References Cited

U.S. PATENT DOCUMENTS

| | | | | |
|---|---|---|---|---|
| 6,534,722 | B2 * | 3/2003 | Takaoka | H05K 7/20963 174/254 |
| 2005/0073640 | A1 | 4/2005 | Dunn et al. | |
| 2005/0285986 | A1 * | 12/2005 | Kim | G02F 1/136286 349/42 |
| 2006/0055859 | A1 * | 3/2006 | Jin | G02F 1/134363 349/141 |
| 2007/0058114 | A1 * | 3/2007 | Niiyama | G02F 1/13 349/106 |

(Continued)

FOREIGN PATENT DOCUMENTS

| | | |
|---|---|---|
| EP | 1107047 A2 | 6/2001 |
| JP | 2006317926 A | 11/2006 |

(Continued)

*Primary Examiner* — Edward J Glick
*Assistant Examiner* — David Y Chung
(74) *Attorney, Agent, or Firm* — Cantor Colburn LLP

(57) ABSTRACT

A curved liquid crystal display panel includes an upper substrate having a curved shape, a liquid crystal layer, a lower substrate having a curved shape, where the lower substrate is combined with the upper substrate and the liquid crystal layer is disposed between the upper substrate and the lower substrate, and a heating line disposed on at least one of the upper substrate and the lower substrate and which provides heat to the liquid crystal layer such that a temperature of the liquid crystal layer increases.

26 Claims, 22 Drawing Sheets

(56) References Cited

U.S. PATENT DOCUMENTS

| | | | | |
|---|---|---|---|---|
| 2007/0151506 A1* | 7/2007 | You | G02F 1/133382 | |
| | | | | 117/61 |
| 2008/0291386 A1* | 11/2008 | Dunn | G02F 1/133382 | |
| | | | | 349/161 |
| 2009/0161048 A1* | 6/2009 | Satake | G02F 1/133305 | |
| | | | | 349/110 |
| 2009/0251397 A1* | 10/2009 | Dunn | G02F 1/133382 | |
| | | | | 345/87 |
| 2010/0238098 A1* | 9/2010 | Watanabe | G02F 1/1339 | |
| | | | | 345/87 |
| 2012/0062827 A1* | 3/2012 | Yoshida | G02F 1/133707 | |
| | | | | 349/123 |

FOREIGN PATENT DOCUMENTS

| | | |
|---|---|---|
| JP | 2007102210 A | 4/2007 |
| KR | 1020060001425 A | 1/2006 |
| KR | 1020070019377 A | 2/2007 |
| KR | 1020070035373 A | 3/2007 |

\* cited by examiner

FIG. 3

| SCREEN | NORMAL (FLAT) | | | | | AFTER EMPLOYING A CURVATURE (CURVATURE RADIUS : 4000R) | | | | |
|---|---|---|---|---|---|---|---|---|---|---|
| | LEFT | CENTER | RIGHT | LEFT-CENTER | RIGHT-CENTER | LEFT | CENTER | RIGHT | LEFT-CENTER | RIGHT-CENTER |
| x | 0.2792 | 0.2758 | 0.2757 | 0.0034 | 0.0001 | 0.2867 | 0.2754 | 0.2793 | 0.0113 | 0.0039 |
| y | 0.3008 | 0.2982 | 0.2989 | 0.0026 | 0.0007 | 0.3097 | 0.2988 | 0.3027 | 0.0109 | 0.0039 |
| L | 354.1 | 422.3 | 496.5 | -68.2 | 74.2 | 309 | 427 | 455 | -118 | 28 |
| VIEWING LEVEL | NOT VIEWED | | | | | STRONG | | | | |

FIG. 4

| TEMPERATURE OF CELL | 29.0°C | 30.0°C | 31.0°C | 32.0°C | 33.0°C | 34.0°C | 35.0°C | 36.0°C | 37.0°C | 38.0°C | 39.0°C | 40.0°C |
|---|---|---|---|---|---|---|---|---|---|---|---|---|
| x | 0.277 | 0.2768 | 0.2766 | 0.2763 | 0.2761 | 0.2758 | 0.2756 | 0.2754 | 0.2751 | 0.2749 | 0.2745 | 0.2743 |
| y | 0.2975 | 0.2973 | 0.297 | 0.2966 | 0.2963 | 0.2959 | 0.2956 | 0.2953 | 0.2949 | 0.2946 | 0.2942 | 0.2938 |
| L | 271.0 | 270.6 | 270.1 | 269.8 | 269.5 | 269.0 | 268.7 | 268.4 | 268.0 | 267.8 | 267.4 | 266.9 |
| YELLOWISH | MIDDLE LEVEL | | | | WEAK LEVEL | | | VERY WEAK LEVEL | | | NOT VIEWED | |

FIG. 5

|  |  | LEFT PORTION | CENTER PORTION | RIGHT PORTION |
|---|---|---|---|---|
| MEASURING RESULT | RISING | 12.37 | 11.50 | 10.41 |
|  | FALLING | 5.23 | 4.81 | 4.63 |
|  | G TO G | 8.56 | 7.17 | 6.52 |
| DEVIATION | RISING | -0.87 |  | 1.09 |
|  | FALLING | -0.42 |  | 0.18 |
|  | G TO G | -1.39 |  | 0.65 |
| SURFACE TEMPERATURE OF CELL |  | 30.4°C | 31.1°C | 34.9°C |

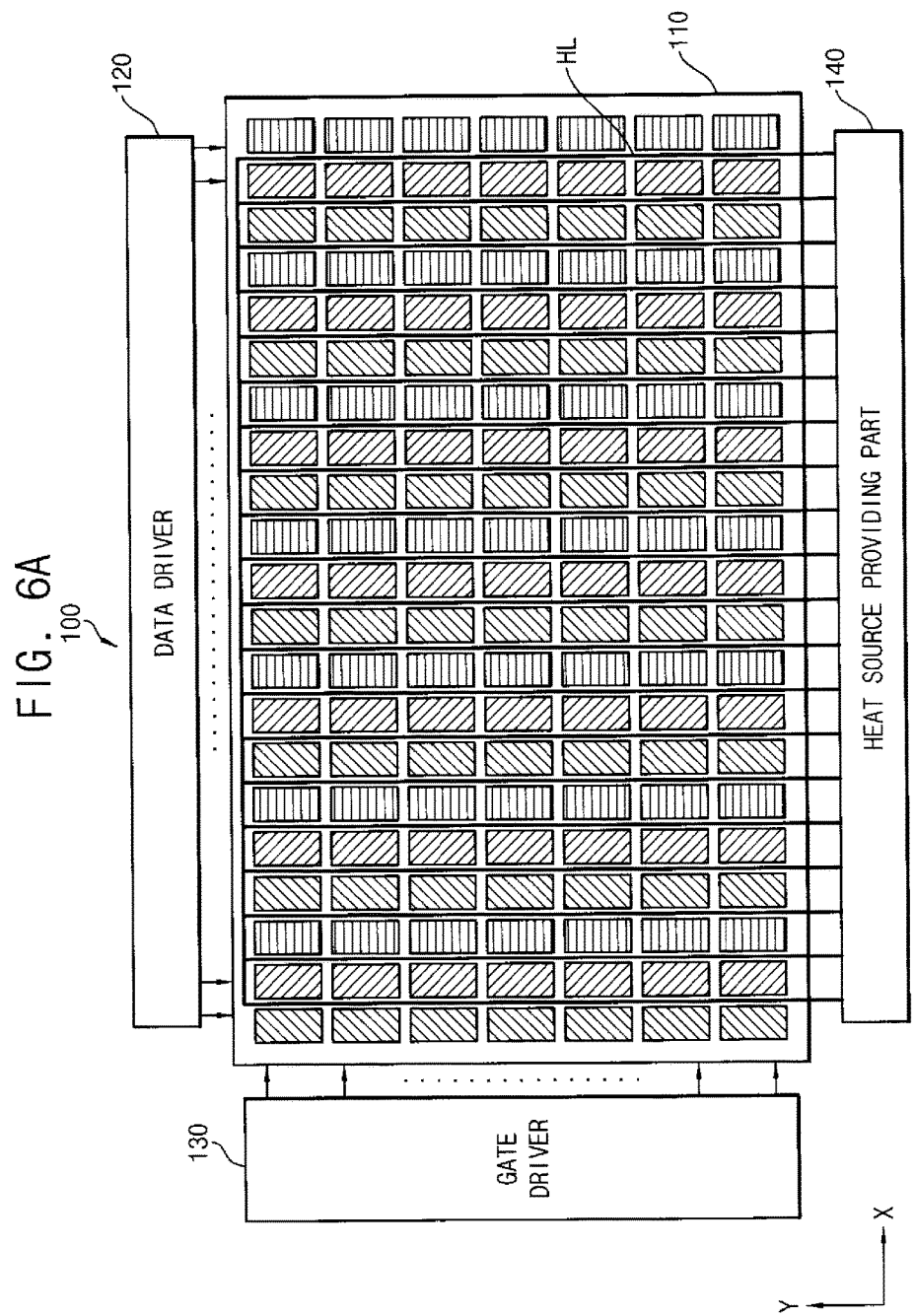

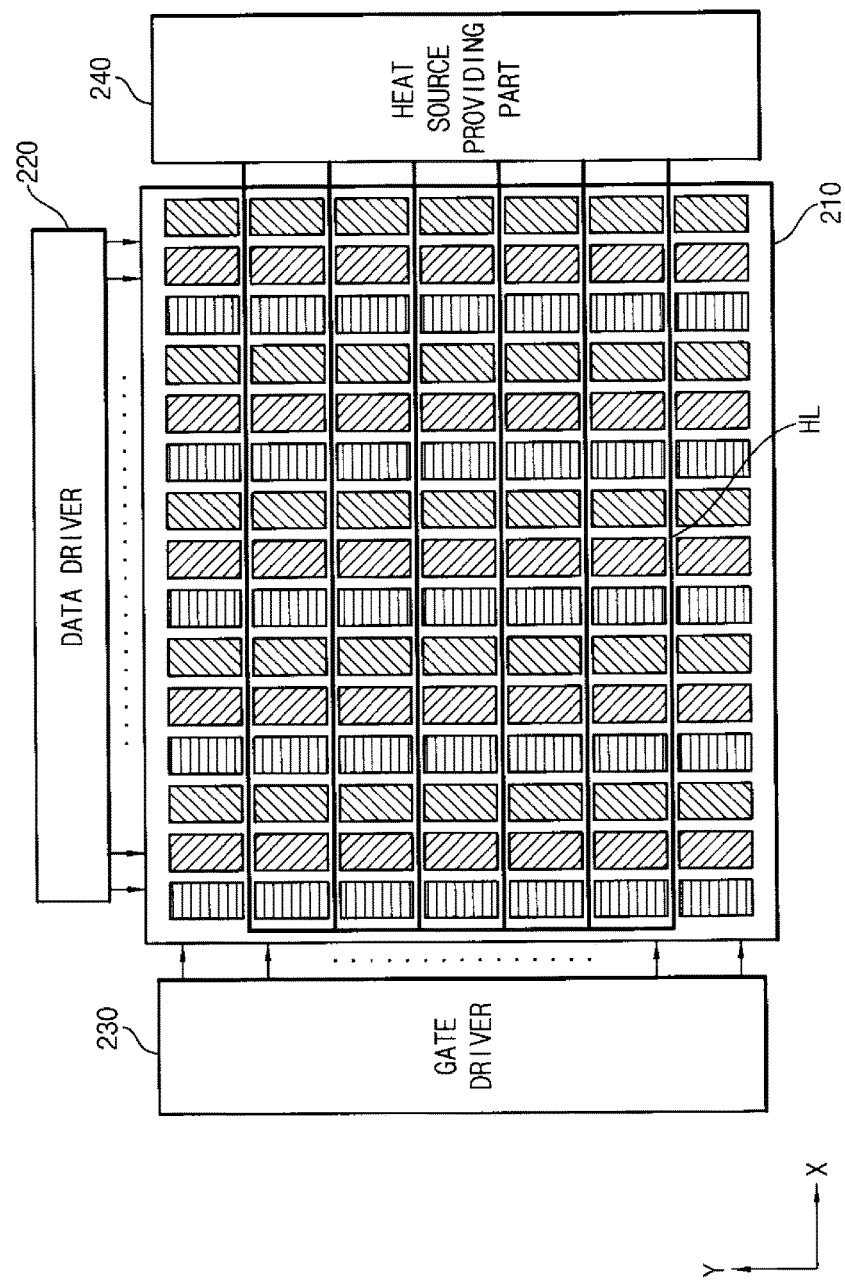

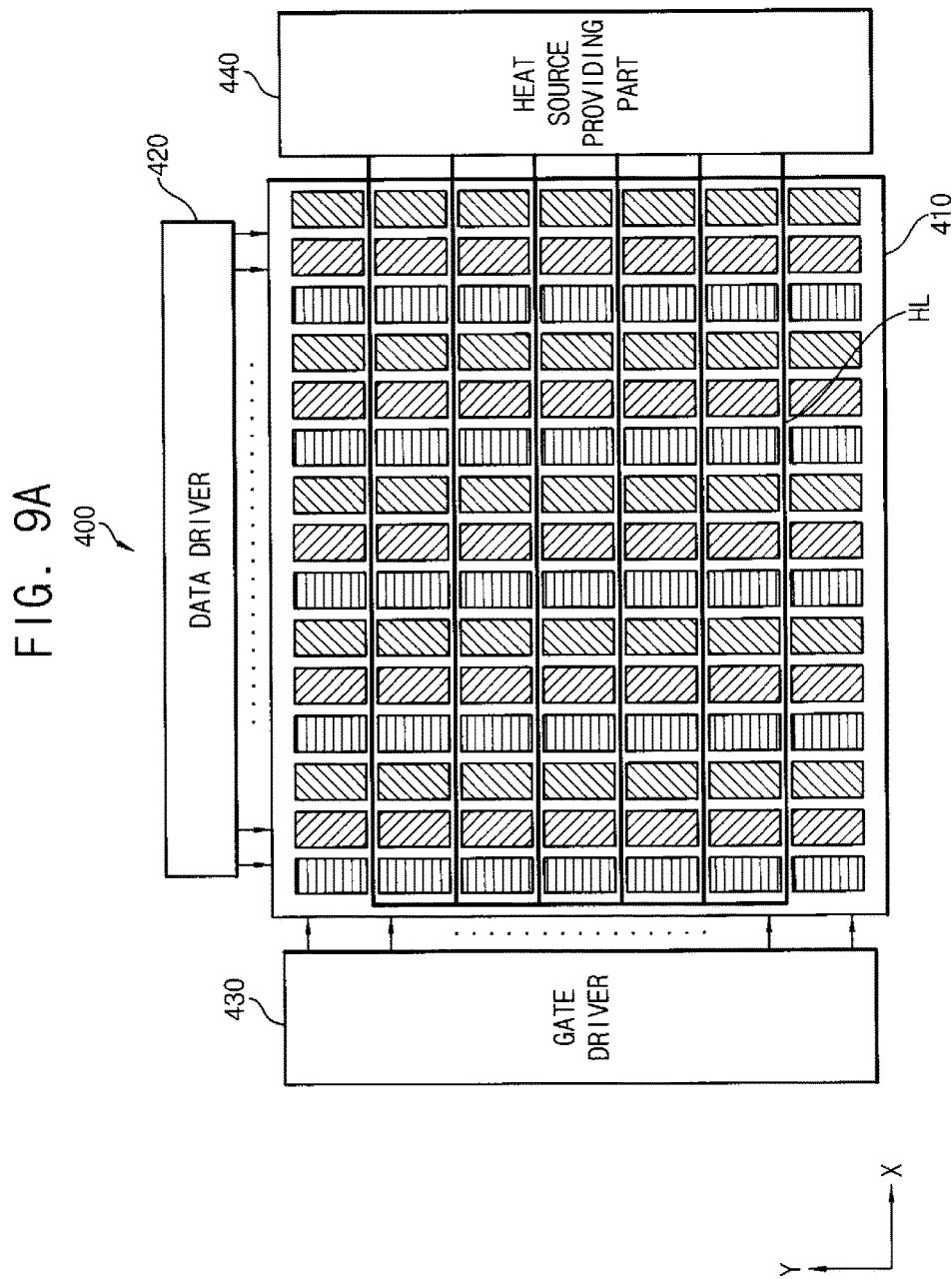

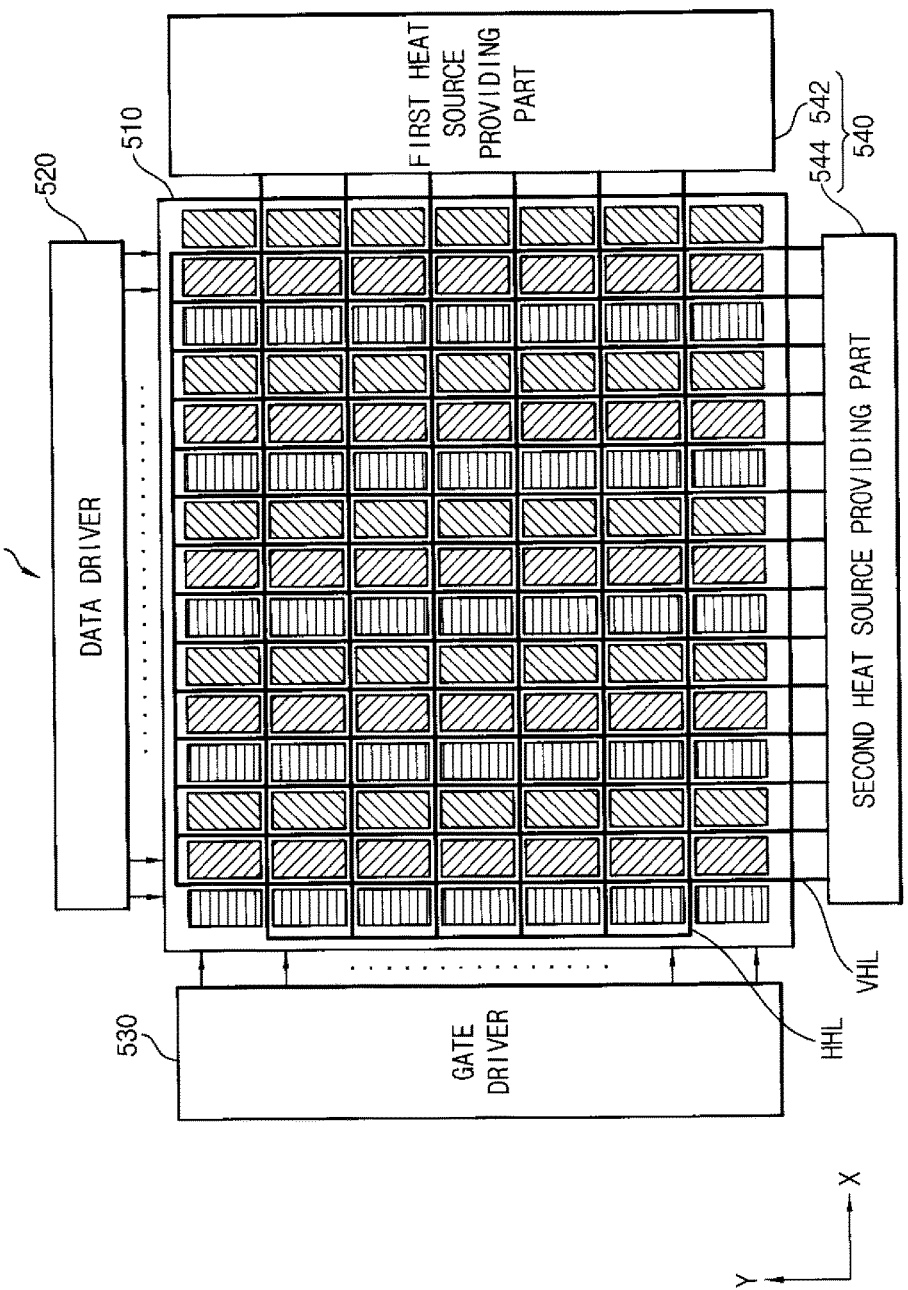

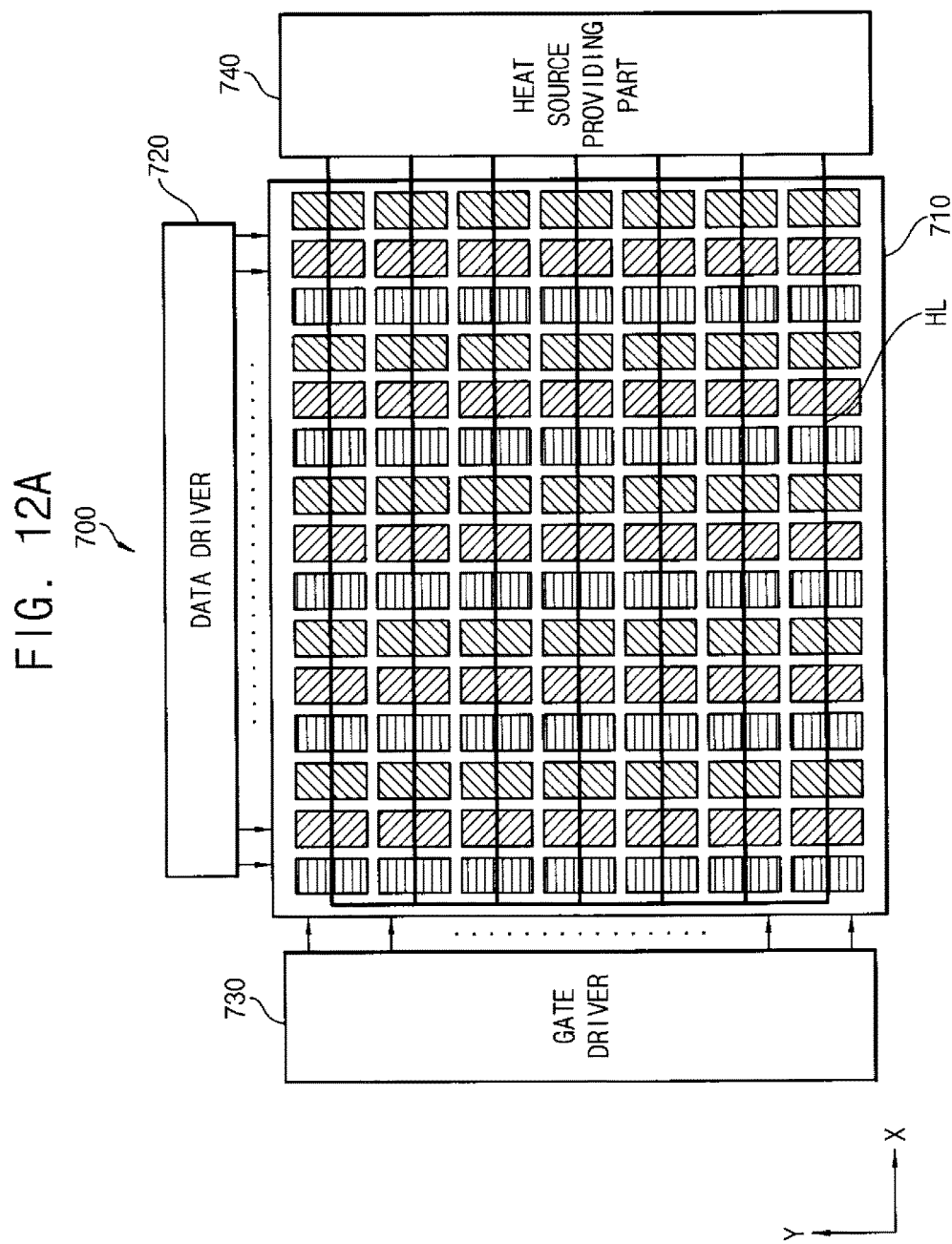

CURVED LIQUID CRYSTAL DISPLAY PANEL AND CURVED DISPLAY DEVICE HAVING THE SAME

This application claims priority to Korean Patent Application No. 10-2012-0091787, filed on Aug. 22, 2012, and all the benefits accruing therefrom under 35 U.S.C. § 119, the content of which in its entirety is herein incorporated by reference.

BACKGROUND (1) Field

Exemplary embodiments of the invention relate to a curved liquid crystal display panel and a curved display panel device including the curved liquid crystal display panel. More particularly, exemplary embodiments of the invention relate to a curved liquid crystal display panel with improved display characteristics and a curved display panel device including the curved liquid crystal display panel.

(2) Description of the Related Art

In recent, as a liquid crystal display ("LCD") device has come to be used as display devices of television receivers, the screens of such LCD devices have become increasingly bigger. As a size of screen of television LCD screens increases, the viewing angle difference between the viewing angle when the viewer views from the center portion of the screen and the viewing angle when the viewer views from the left and right edges of the screen increases. The technical term "viewing angle" is defined as the angle between the line of sight of the viewer viewing the screen and the tangent to the intersection between the line of sight and the observed screen surface, and the difference between the center and left/right edge viewing angles is referred to as "viewing angle difference."

Furthermore, in large-scale television LCD screens, glare off in the screens also increases. The difference in viewing angle may be corrected by curving the screen into a concave shape.

However, when a display panel is curved to have the concave shaped screen, a display defects such as a yellowish image is generated due to a stress of the curved surface (hereinafter, a curvature stress).

Yellowish color defects occur on a screen of a display panel when yellow color components are included in an image to be displayed thereon. For example, when an image is displayed by three colors such as red (R), green (G) and blue (B), transmittance of a B color pixel corresponding to blue color is lower than transmittance of other color pixels such that yellowish color defects occur.

SUMMARY

Exemplary embodiments of the invention provide a curved liquid crystal display panel with improved display characteristics by effectively preventing a display defects such as yellowish color defects.

Exemplary embodiments of the invention provide a curved display device including the above-mentioned curved liquid crystal display panel.

According to an exemplary embodiment of the invention, a curved liquid crystal display panel includes an upper substrate having a curved shape, a lower substrate having a curved shape, a liquid crystal layer disposed between the upper substrate and the lower substrate, and a heating line disposed on at least one of the upper substrate and the lower substrate.

In an exemplary embodiment, the heating line may be disposed substantially uniformly on the lower substrate.

In an exemplary embodiment, the heating line may be disposed on a portion of the lower substrate.

In an exemplary embodiment, the heating line is disposed in an area where buckling occurs when the upper substrate and the lower substrate are combined with each other and curved.

In an exemplary embodiment, the lower substrate may further include a pixel electrode and a data line which provides the pixel electrode with a data signal. In such an embodiment, a resistance of the heating line may be greater than a resistance of the data line.

In an exemplary embodiment, the lower substrate may further include a pixel electrode, and a data line which provides the pixel electrode with a data signal. In such an embodiment, the heating line may be substantially parallel to the data line.

In an exemplary embodiment, the lower substrate may further include a pixel electrode, a switching element electrically connected to the pixel electrode, a data line connected to an input terminal of the switching element, and a gate line connected to a control terminal of the switching element. In such an embodiment, the heating line may be disposed on an area not overlapping the pixel electrode when viewed from a top view.

In an exemplary embodiment, the lower substrate may further include a pixel electrode, a switching element electrically connected to the pixel electrode, a data line connected to an input terminal of the switching element, and a gate line connected to a control terminal of the switching element. In such an embodiment, the heating line may be disposed overlapping a portion of the pixel electrode when viewed from a top view.

In an exemplary embodiment, the lower substrate may further include a pixel electrode, a switching element electrically connected to the pixel electrode, a data line connected to an input terminal of the switching element, and a gate line connected to a control terminal of the switching element. In such an embodiment, the heating line may be substantially parallel to the gate line.

In an exemplary embodiment, the lower substrate may further include a pixel electrode, a switching element electrically connected to the pixel electrode, a data line connected to an input terminal of the switching element, and a gate line connected to a control terminal of the switching element. In such an embodiment, the heating line may include a vertical heating line substantially parallel to the data line and a horizontal heating line substantially parallel to the gate line.

In an exemplary embodiment, the lower substrate may further include a pixel electrode, a switching element electrically connected to the pixel electrode, a data line connected to an input terminal of the switching element, and a gate line connected to a control terminal of the switching element. In such an embodiment, the heating line may include a vertical heating line substantially parallel to the data line and a horizontal heating line substantially parallel to the gate line, and the vertical and horizontal heating lines may overlap a portion of the pixel electrode.

In an exemplary embodiment, the upper substrate may include a black matrix layer. In such an embodiment, the heating line may be disposed on the upper substrate and overlap the black matrix layer.

In an exemplary embodiment, the heating line may increase the temperature of the liquid crystal layer such that a refractive index difference of the liquid crystal layer may be decreased.

In an exemplary embodiment, the heating line may provide heat to the liquid crystal layer such that a temperature of the liquid crystal layer increases.

According to another exemplary embodiment of the invention, a curved liquid crystal display device includes: a curved liquid crystal display panel including an upper substrate, a liquid crystal layer, a lower substrate which is combined with the upper substrate, where the liquid crystal layer is disposed between the upper substrate and the lower substrate; and a heating line disposed on at least one of the upper substrate and the lower substrate; and a heat source providing part which provides a power to the heating line.

In an exemplary embodiment, the heating line may be disposed substantially uniformly on the lower substrate. In such an embodiment, the heat source providing part may provide the heating line with powers different from each other.

In an exemplary embodiment, the curved liquid crystal display panel may include a first area where buckling occurs due to a bending of the curved liquid crystal display panel and a second area where buckling does not occur. In such an embodiment, a power provided to a heating line corresponding to the first area may be substantially greater than a power provided to a heating line corresponding to the second area.

In an exemplary embodiment, the curved liquid crystal display may include a first area where buckling occurs due to a bending of the curved liquid crystal display panel and a second area where buckling does not occur. In such an embodiment, the heating line may be disposed on the first area.

In an exemplary embodiment, the curved liquid crystal display panel may further include a pixel electrode, a switching element electrically connected to the pixel electrode, a data line connected to an input terminal of the switching element, and a gate line connected to a control terminal of the switching element. In such an embodiment, a resistance of the heating line may be substantially greater than a resistance of the data line.

In an exemplary embodiment, the curved liquid crystal display panel may further include a pixel electrode, and a data line which provides a data signal to the pixel electrode. In such an embodiment, the heating line and the data line may be substantially parallel to each other.

In an exemplary embodiment, the curved liquid crystal display panel may further include a pixel electrode, a switching element electrically connected to the pixel electrode, a data line connected to an input terminal of the switching element, and a gate line connected to a control terminal of the switching element. In such an embodiment, the heating line may be disposed on an area not overlapping the pixel electrode when viewed from a top view.

In an exemplary embodiment, the curved liquid crystal display panel may further include a pixel electrode, a switching element electrically connected to the pixel electrode, a data line connected to an input terminal of the switching element, and a gate line connected to a control terminal of the switching element. In such an embodiment, the heating line may be disposed overlapping a portion of the pixel electrode when viewed from a top view.

In an exemplary embodiment, the curved liquid crystal display panel may further include a pixel electrode, a switching element electrically connected to the pixel electrode, a data line connected to an input terminal of the switching element, and a gate line connected to a control terminal of the switching element. In such an embodiment, the heating line and the gate line may be substantially parallel to each other.

In an exemplary embodiment, the curved liquid crystal display panel may further include a pixel electrode, a switching element electrically connected to the pixel electrode, a data line connected to an input terminal of the switching element, and a gate line connected to a control terminal of the switching element. In such an embodiment, the heating line may include a vertical heating line substantially parallel to the data line and a horizontal heating line substantially parallel to the gate line.

In an exemplary embodiment, the curved liquid crystal display panel may further include a pixel electrode, a switching element electrically connected to the pixel electrode, a data line connected to an input terminal of the switching element, and a gate line connected to a control terminal of the switching element. In such an embodiment, the heating line may include a vertical heating line substantially parallel to the data line and a horizontal heating line substantially parallel to the gate line, and the vertical and horizontal heating lines may be overlap a portion of the pixel electrode.

In an exemplary embodiment, the upper substrate may include a black matrix layer. In such an embodiment, the heating line may be disposed on the upper substrate overlapping the black matrix layer.

In an exemplary embodiment, the heating line may provide heat to the liquid crystal layer such that a temperature of the liquid crystal layer increases.

According to still another exemplary of the invention, a curved liquid crystal display device includes a curved liquid crystal display panel and a heat source disposed at a rear surface of the curved liquid crystal display panel and which emits heat.

In an exemplary embodiment, the curved liquid crystal display device may further include a backlight unit which provides the curved liquid crystal display panel with light, and the heat source may be disposed on a rear surface of the backlight unit.

In an exemplary embodiment, the heat source may be disposed on a rear surface of a rear case of the curved liquid crystal display panel.

In an exemplary embodiment, the heat source may be disposed substantially parallel to a short side of the curved liquid crystal display panel.

In an exemplary embodiment, the curved liquid crystal display panel may include an upper substrate and a lower substrate. In such an embodiment, the heat source is disposed on a portion where buckling occurs due to a bending of the curved liquid crystal display panel.

In an exemplary embodiment, the heat source may be disposed on an area corresponding to yellowish color defects generated in the curved liquid crystal display panel, and a refractive index difference of a liquid crystal layer of the curved liquid crystal display panel may be decreased by the heat source.

According to one or more exemplary embodiments of a curved liquid crystal display panel and a curved display panel device having the curved liquid crystal display panel, a heating line which induces a temperature increasing of a liquid crystal layer is disposed on a curved liquid crystal panel, such that a refractive index difference of a liquid crystal layer is decreased, thereby effectively prevent display defects such as displaying a yellowish color to enhance display characteristics. In such embodiments, the temperature of the liquid crystal layer is increased, thereby increasing a response speed of liquid crystal molecules.

BRIEF DESCRIPTION OF THE DRAWINGS

The above and other features of the invention will become more apparent by describing in detailed exemplary embodiments thereof with reference to the accompanying drawings, in which:

FIG. 3 is a diagram showing whether or not a yellowish image is viewed in correspondence with prior to employing a curvature and after employing a curvature;

FIG. 4 is a table showing a viewing amount of yellowish image in accordance with temperature variance in a curved liquid crystal display device of FIG. 3;

FIG. 5 is a table showing a measuring result of response speed of liquid crystals in accordance with disposition of a heat source for increasing a temperature;

FIG. 6A is a block diagram schematically showing an exemplary embodiment of a curved liquid crystal display device according to of the invention;

FIG. 7A is a block diagram schematically showing an alternative exemplary embodiment of a curved liquid crystal display device according to the invention;

FIG. 9A is a block diagram schematically showing yet another alternative exemplary embodiment of a curved liquid crystal display device according to the invention;

FIG. 10A is a block diagram schematically showing still another alternative exemplary embodiment of a curved liquid crystal display device according to the invention;

FIG. 12A is a block diagram schematically showing still another alternative exemplary embodiment of a curved liquid crystal display device according to the invention;

DETAILED DESCRIPTION

Figure 1:
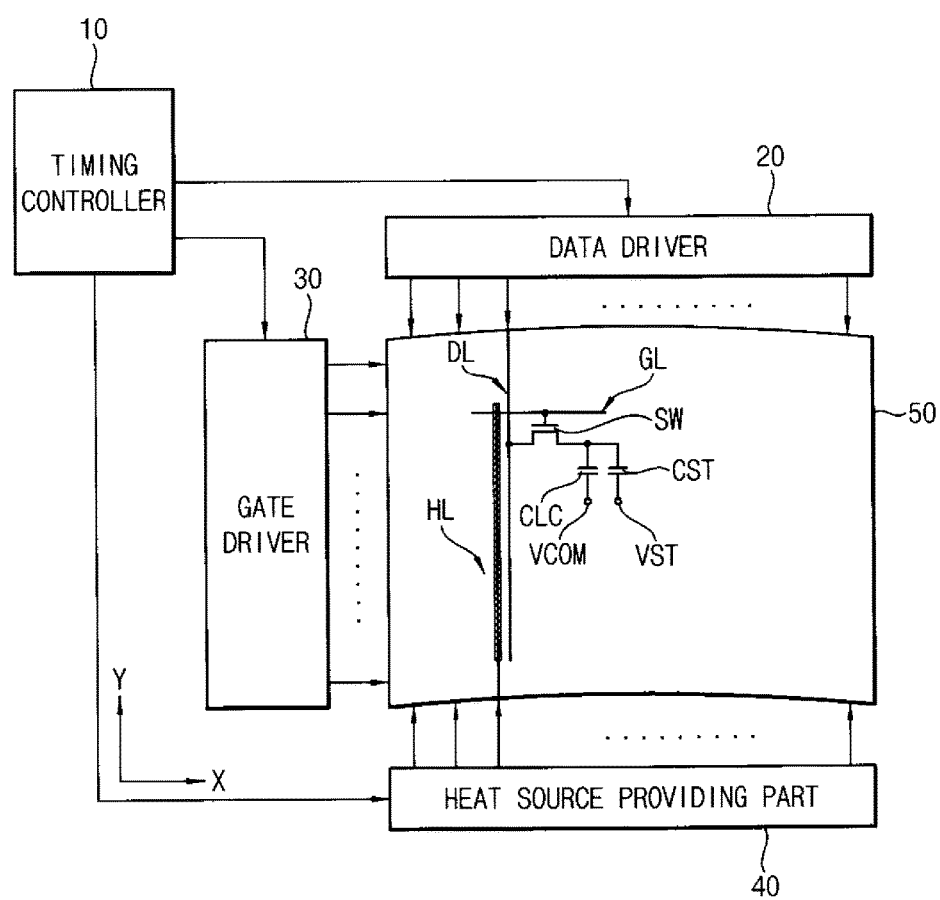
FIG. 1 is a block diagram showing an exemplary embodiment of a curved liquid crystal display device according to the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

A technical term "viewing angle" is defined as the angle between the line of sight of the viewer viewing the screen and the tangent to the intersection between the line of sight and the observed screen surface, and the difference between the center and left/right edge viewing angles is defined as and used to mean the "viewing angle difference".

Hereinafter, exemplary embodiments of a curved display panel and a curved display device including the curved display panel according to the invention will be explained in detail with reference to the accompanying drawings.

FIG. 1 is a block diagram showing an exemplary embodiment of a curved liquid crystal display device according to the invention.

Referring to FIG. 1, an exemplary embodiment of a curved display liquid crystal display device according to the invention includes a timing controller 10, a data driver 20, a gate driver 30, a heat source providing part 40 and a curved liquid crystal display panel 50.

The timing controller 10 provides the data driver 20 with an image signal for displaying an image on the curved liquid crystal display panel 50 and a first control signal for driving the data driver 20, provides the gate driver 30 with a second control signal for driving the gate driver 30, and provides the heat source providing part 40 with a third control signal for driving the heat source providing part 40.

The data driver 20 outputs a data signal to a data line DL disposed on the curved liquid crystal display panel 50 to display an image.

The gate driver 30 outputs a gate signal to a gate line GL disposed on the curved liquid crystal display panel 50.

The heat source providing part 40 provides powers to a corresponding heating line to generate heat at the corresponding heating line of a plurality of heating lines provided on the curved liquid crystal display panel 50. In one exemplary embodiment, for example, the heat source providing part 40 may provide powers substantially equal to each other to the heating lines. In an alternative exemplary embodiment, the heat source providing part 40 may provide powers different from each other to the heating lines.

The curved liquid crystal display panel 50 includes an upper substrate (not shown) having a curved shape, a liquid crystal layer (not shown) and a lower substrate (not shown) coupled with the upper substrate to receive the liquid crystal layer. In an exemplary embodiment, the heating lines HL which induce a temperature increase are disposed on the lower substrate such that a refractive index difference of the liquid crystal layer decreases. Here, the refractive index difference means a difference between a horizontal refractive index and a vertical refractive index of liquid crystal molecules.

In an exemplary embodiment, for example, the curved liquid crystal display panel 50 includes a data line DL, a gate line GL, a switching element SW, a liquid crystal capacitor CLC, a storage capacitor CST and a heating line HL. In one exemplary embodiment, for example, the heating line HL may be disposed on the upper substrate. In an alternative exemplary embodiment, the heating line HL may be disposed on the lower substrate.

In an exemplary embodiment, the heating line HL may be uniformly or partially provided on a curved liquid crystal display panel. In one exemplary embodiment, for example, where the heating line HL is partially provided on the curved liquid crystal display panel, the heating line HL may be disposed in an area where buckling occurs when the upper substrate is combined with the lower substrate to be curved. The heating line HL may have a resistance greater than a resistance of another signal line such as the data line DL or the gate line GL.

In an exemplary embodiment, the heating line HL is disposed substantially parallel to the data line DL. The heating lines HL are spaced apart from the data line DL by a predetermined interval.

Figure 2A:
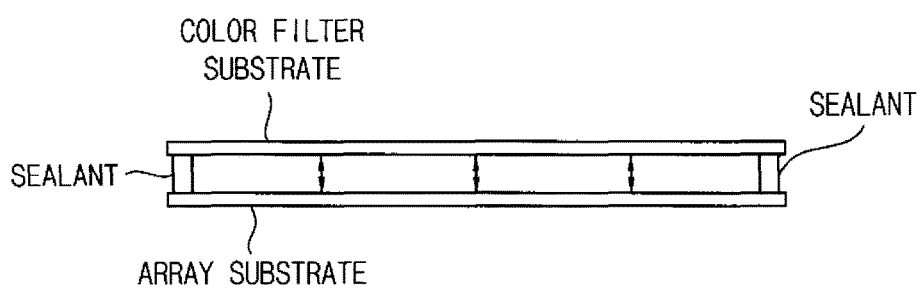
FIG. 2A is a cross-sectional view of an exemplary embodiment of a flat liquid crystal display device.
Figure 2B:
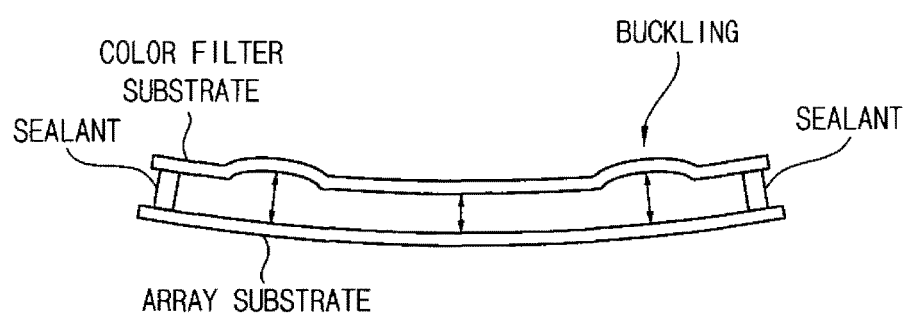
FIG. 2B is a cross-sectional view of an exemplary embodiment of a curved liquid crystal display device.

FIG. 2A is a cross-sectional view of an exemplary embodiment of a flat liquid crystal display device. FIG. 2B is a cross-sectional view of an exemplary embodiment of a curved liquid crystal display device. Particularly, FIG. 2A is a cross-sectional view of a flat liquid crystal display device prior to employing a curvature, and FIG. 2B is a cross-sectional view of a curved liquid crystal display device after employing a curvature. For one example, a curved lower substrate and a curved upper substrate are combined with each other to form the curved liquid crystal display device. For another example, a flat lower substrate and a flat upper substrate are combined with each other, and then a combined two substrates are inserted into a receiving container such as a mold frame to form the curved liquid crystal display device.

Referring to FIG. 2A, a flat liquid crystal display panel includes a lower substrate (e.g., an array substrate), an upper substrate (e.g., a color filter substrate), a liquid crystal layer disposed between the lower substrate and the upper substrate, and a sealant for sealing the lower substrate and the upper substrate. An interval between the lower substrate and the upper substrate may define a cell gap of the liquid crystal layer.

Referring to FIG. 2B, in an exemplary embodiment, a curved liquid crystal display panel may be manufactured by adapting a curvature to a flat liquid crystal display panel. In such an embodiment, a compression may occur at the upper substrate, and an expansion may occur at the lower substrate. Thus, a cell gap of a liquid crystal layer is increased at a portion of the curved liquid crystal display panel. When the cell gap of the liquid crystal layer is increased at a portion of the liquid crystal display panel, a transmittance ratio of a blue color pixel is decreased in comparison with another portion of the liquid crystal display panel such that a yellowish image is viewed.

As shown in FIG. 2B, a protruded area or a buckled portion is formed by combining and curving the upper and lower substrates. Accordingly, the buckling occurs in the buckled portion formed by combining and curving the upper and lower substrates.

FIG. 3 is a diagram showing whether or not a yellowish image is viewed in a flat liquid crystal display panel prior to employing a curvature and in a flat liquid crystal display panel after employing a curvature. Hereinafter, a term "X color coordinate" ('x' in FIG. 3) means a white X value in CIE 1931 chromaticity diagram. Moreover, a term "Y color coordinate" ('y' in FIG. 3) means a white Y value in CIE 1931 chromaticity diagram.

Referring to FIG. 3, in a flat liquid crystal display device prior to employing a curvature, X-color coordinate, Y-color coordinate and a luminance CU in FIG. 3) corresponding to a left portion thereof are about 0.2792, 0.3008 and 354.1 candelas per square meter (cd/m$^2$), respectively. X-color coordinate, Y-color coordinate and a luminance corresponding to a central portion thereof are about 0.2758, 0.2982 and 422.3 cd/m$^2$, respectively. X-color coordinate, Y-color coordinate and a luminance corresponding to a right portion thereof are about 0.2757, 0.2989 and 496.5 cd/m$^2$, respectively. When the right portion is subtracted from the left portion, an X-color coordinate difference, a Y-color coordinate difference and a luminance difference may be about 0.0034, 0.0026 and −68.2 cd/m$^2$, respectively. In FIG. 3, when the left portion is subtracted from the right portion, an X-color coordinate difference, a Y-color coordinate difference and a luminance difference may be about 0.0001, 0.0007 and 74.2 cd/m$^2$, respectively.

In a curved liquid crystal display device having a curvature radius after employing a curvature, X-color coordinate, Y-color coordinate and a luminance corresponding to a left portion thereof are observed 0.2867, 0.3097 and 309 cd/m$^2$, respectively. X-color coordinate, Y-color coordinate and a luminance corresponding to a central portion thereof are about 0.2754, 0.2988 and 427 cd/m$^2$, respectively. X-color coordinate, Y-color coordinate and a luminance corresponding to a right portion thereof are about 0.2793, 0.3027 and 455 cd/m$^2$, respectively. When the right portion is subtracted from the left portion, an X-color coordinate difference, a Y-color coordinate difference and a luminance difference may be about 0.0113, 0.0109 and −118 cd/m$^2$, respectively. When the left portion is subtracted from the right portion, an X-color coordinate difference, a Y-color coordinate difference and a luminance difference may be about 0.0039, 0.0039 and 28 cd/m$^2$, respectively.

When a liquid crystal display device is curved in a predetermined curvature, X-color coordinate and Y-color coordinate may be increased. The increasing of X-color coordinate and Y-color coordinate means that a standard white moves toward a red area and a green area in CIE 1931 chromaticity diagram. When the standard white moves toward the red area and the green area, a transmittance ratio of a blue color pixel may be decreased.

As shown in FIG. 3, a yellowish image is not viewed in a flat liquid crystal display device corresponding to prior to employing a curvature. However, when a curvature is employed to a flat liquid crystal display device, a yellowish image is viewed in a curved liquid crystal display device.

Conventionally, a phase difference of liquid crystal layer is defined as Δnd (where, 'Δn' denotes a difference between a horizontal refractive ratio and a vertical refractive ratio, and 'd' denotes a cell gap of a liquid crystal layer). When a cell gap 'd' of a liquid crystal layer is increased, a transmittance ratio of blue color pixel is decreased such that a yellowish image is generated. However, the yellowish image may be effectively prevented when a temperature of a liquid crystal layer is increased.

FIG. 4 is a table showing a viewing amount of yellowish image in accordance with temperature variation in a curved liquid crystal display device of FIG. 3.

Referring to FIG. 4, when a liquid crystal layer has a temperature of about 29 degrees Celsius (° C.), it was observed that X-color coordinate, Y-color coordinate and a luminance are about 0.277, 0.2975 and 271.0 cd/m$^2$, respectively. When a liquid crystal layer has a temperature of about 30 degrees Celsius, it was observed that X-color coordinate, Y-color coordinate and a luminance are about 0.2768, 0.2973 and 270.6 cd/m$^2$, respectively. When a liquid crystal layer is has a temperature of about 29 degrees Celsius, it was observed that X-color coordinate, Y-color coordinate and a luminance are about 0.2766, 0.297 and 270.1 cd/m$^2$, respectively. When a liquid crystal layer is has a temperature of about 29 degrees Celsius, it was observed that X-color coordinate, Y-color coordinate and a luminance are 0.2763, 0.2966 and 269.8 cd/m$^2$, respectively. Thus, when a liquid crystal layer has a temperature in a range from about 29 to about 32 degrees Celsius, a yellowish image is viewed in a middle level.

When a liquid crystal layer has a temperature of about 33 degrees Celsius, it was observed that X-color coordinate, Y-color coordinate and a luminance are 0.2761, 0.2963 and 269.5 cd/m$^2$, respectively. When a liquid crystal layer is has a temperature of about 34 degrees Celsius, it was observed that X-color coordinate, Y-color coordinate and a luminance are 0.2758, 0.2959 and 269.0 cd/m$^2$, respectively. When a liquid crystal layer is has a temperature of about 35 degrees Celsius, it was observed that X-color coordinate, Y-color coordinate and a luminance are 0.2756, 0.2956 and 268.7 cd/m$^2$, respectively. Thus, when a liquid crystal layer has a temperature in a range from about 33 to about 35 degrees Celsius, a yellowish image is viewed in a weak level.

When a liquid crystal layer has a temperature of about 36 degrees Celsius, it was observed that X-color coordinate, Y-color coordinate and a luminance are 0.2754, 0.2953 and 268.4 cd/m$^2$, respectively. When a liquid crystal layer is has a temperature of about 37 degrees Celsius, it was observed that X-color coordinate, Y-color coordinate and a luminance are 0.2751, 0.2949 and 268.0 cd/m$^2$, respectively. When a liquid crystal layer is has a temperature of about 38 degrees Celsius, it was observed that X-color coordinate, Y-color coordinate and a luminance are 0.2749, 0.2946 and 267.8 cd/m$^2$, respectively. Thus, when a liquid crystal layer has a temperature in a range from about 36 to about 38 degrees Celsius, a yellowish image is viewed in a very weak level.

When a liquid crystal layer has a temperature of about 39 degrees Celsius, it was observed that X-color coordinate, Y-color coordinate and a luminance are 0.2745, 0.2942 and 267.4 cd/m$^2$, respectively. When a liquid crystal layer is has a temperature of about 40 degrees Celsius, it was observed that X-color coordinate, Y-color coordinate and a luminance are 0.2743, 0.2938 and 266.9 cd/m$^2$, respectively. Thus, when a liquid crystal layer has a temperature in a range from about 39 to about 40 degrees Celsius, a yellowish image is not viewed.

As shown in FIG. 4, when a temperature of liquid crystal cell of a liquid crystal display device is increased, X-color coordinate and Y-color coordinate are decreased. The decreasing of X-color coordinate and Y-color coordinate means that a standard white moves toward a blue area in CIE 1931 chromaticity diagram. When the standard white moves toward the blue area, a transmittance ratio of a blue color pixel is increased. Thus, when a temperature of liquid crystal cell is increased, a transmittance ratio of a blue color pixel is increased such that a yellowish image is effectively prevented from being displayed.

As explained hereinbefore, a yellowish image is effectively prevented from being displayed by increasing a temperature of a liquid crystal cell. When a temperature of a liquid crystal cell is increased, a response speed of liquid crystals is also substantially improved.

FIG. 5 is a table showing a measuring result of response speed of liquid crystals in accordance with a disposing of a heat source for increasing a temperature. Particularly, FIG. 5 shows a response speed in accordance with to a temperature variation by disposing a heat source at a right short side of a backlight unit. In FIG. 5, a rising time represents a response property of liquid crystals when varied from the lowest gradation to the highest gradation. A falling time represents a response property of liquid crystals when varied from the highest gradation to the lowest gradation. A gradation-to-gradation (hereinafter, referred to as "G-to-G") time represents an average response property between gradations except the lowest gradation and the highest gradation.

Referring to FIG. 5, a heat source is disposed at a right portion of a backlight unit, and a surface temperature of liquid crystals corresponding to the right portion of the backlight unit is about 34.9 degrees Celsius. When the heat source is disposed at the right portion of the backlight unit, a surface temperature of liquid crystals corresponding to a central portion of the backlight unit is about 31.1 degrees Celsius, and a surface temperature of liquid crystals corresponding to a left portion of the backlight unit is about 30.4 degrees Celsius.

A rising time corresponding to the right portion of the backlight unit is about 10.41 milliseconds, a rising time corresponding to the central portion of the backlight unit is about 11.50 milliseconds, and a rising time corresponding to the left portion of the backlight unit is about 12.37 milliseconds. When a temperature of a liquid crystal cell is increased by the heat source, a liquid crystal layer has a shorter rising time, that is, a faster response speed.

A falling time corresponding to the right portion of the backlight unit is about 4.63 milliseconds, a falling time corresponding to the central portion of the backlight unit is about 4.81 milliseconds, and a falling time corresponding to the left portion of the backlight unit is about 5.23 milliseconds. Thus, when a temperature of a liquid crystal cell is increased by disposing a heat source, a liquid crystal layer has a shorter falling time, that is, a faster response speed.

A G-to-G average time corresponding to the right portion of the backlight unit is about 6.52 milliseconds, a G-to-G average time corresponding to the central portion of the backlight unit is about 7.17 milliseconds, and a G-to-G average time corresponding to the left portion of the backlight unit is about 8.56 milliseconds. Thus, when a temperature of a liquid crystal cell is increased by disposing a heat source, it is determined that a liquid crystal layer has a shorter G-to-G average time, that is, a faster response speed.

In FIG. 5, a heat source is disposed at a backlight unit, and a difference of response speed occurs in accordance with a position of the heat source.

Therefore, a response speed of an area substantially closed to a position where a heat source is disposed is faster than a response speed of an area substantially spaced apart from a position where the heat source is disposed.

Figure 6B:
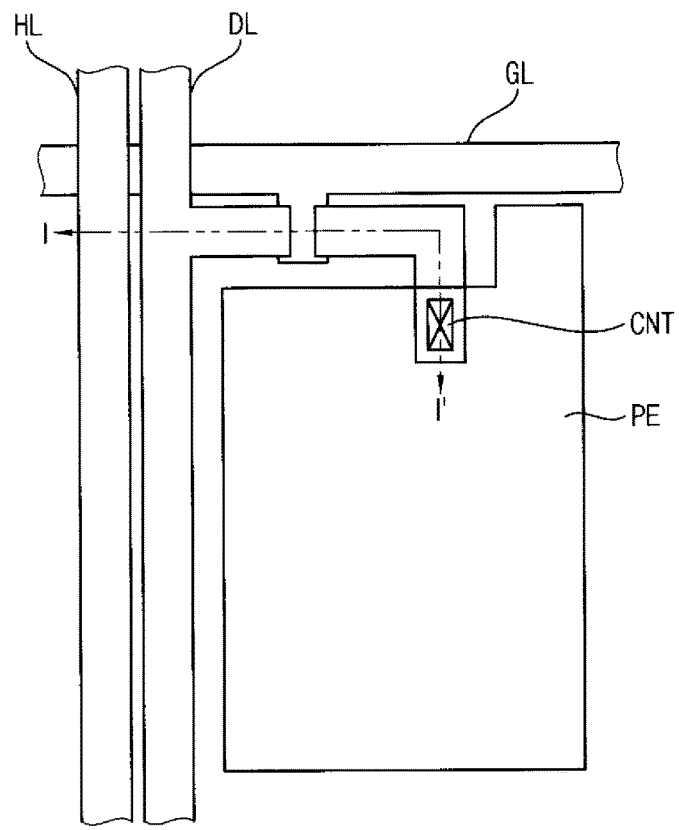
FIG. 6B is a plan view of a unit pixel of FIG. 6A.
Figure 6C:
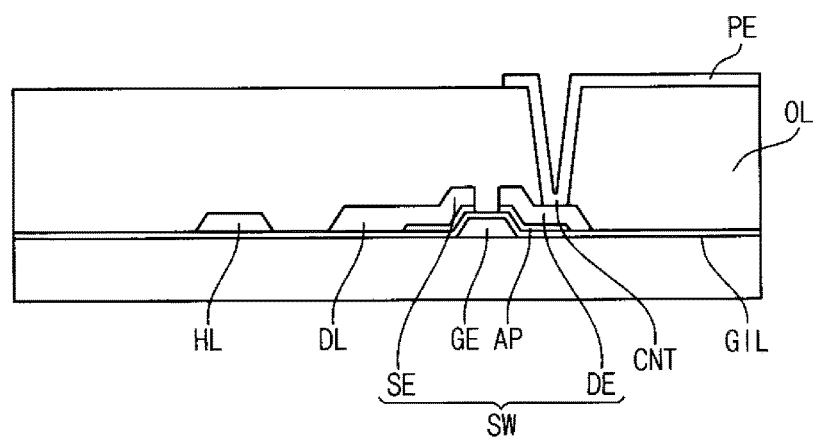
FIG. 6C is a cross-sectional view taken along line I-I' of the unit pixel of FIG. 6B.

FIG. 6A is a block diagram schematically showing an exemplary embodiment of a curved liquid crystal display device according to the invention. FIG. 6B is a plan view of a unit pixel of FIG. 6A. FIG. 6C is a cross-sectional view taken along line I-I' of the unit pixel of FIG. 6B. In an exemplary embodiment, as shown in FIG. 6A, a heating line and a data line are disposed substantially parallel to each other, but not being limited thereto.

Referring to FIG. 6A, an exemplary embodiment of a curved liquid crystal display device 100 according to of the invention includes a curved liquid crystal display 110, a data driver 120, a gate driver 130 and a heat source providing part 140. In the present exemplary embodiment, a curved lower substrate and a curved upper substrate may be combined with each other to form the curved liquid crystal display device. Alternatively, a flat lower substrate and a flat upper substrate may be combined with each other, and then a combined two substrates are inserted into a receiving container such as a mold frame to form the curved liquid crystal display device.

The curved liquid crystal display panel 110 includes a plurality of unit pixels and a plurality of heating lines HL disposed adjacent to the unit pixels. In FIG. 6A, a unit pixel hatched from a right-upper portion to a left-lower portion represents a red color, a unit pixel hatched from a left-upper portion to a right-lower portion represents a green color, and a unit pixel hatched in a horizontal represents a red color.

The heating lines HL extend substantially in a Y-axis direction and arranged along an X-axis direction. In an exemplary embodiment, as shown in FIG. 6A, the heating lines HL are disposed on the curved liquid crystal display panel 110 with a substantially uniform interval therebetween. In an alternative exemplary embodiment, the heating lines HL may be partially disposed on the curved liquid crystal display panel 110. In such an embodiment, when an upper substrate and a lower substrate are combined to form the curved liquid crystal display panel 110, the heating line HL may be disposed in an area where buckling occurs. In such an embodiment, the heating line HL may be provided on the lower substrate.

The data driver 120 outputs a data signal to a unit pixel of the curved liquid crystal display panel 110 to display an image.

The gate driver 130 outputs a gate signal to activate a switching element of the unit pixel disposed in the curved liquid crystal display panel 110.

The heat source providing part 140 provides a corresponding heating line HL with a power voltage to generate heat at the heating lines HL on the curved liquid crystal display panel 110.

Referring to FIGS. 6B and 6C, a lower substrate of the curved liquid crystal display panel 110 includes a plurality of gate lines GL, a plurality of data lines DL crossing the gate lines GL, a plurality of switching elements SW connected to the gate lines GL and the data lines DL, a plurality of pixel electrodes PE respectively connected to the switching elements SW, and a plurality of heating lines HL extends substantially parallel to the data lines DL. The heating lines HL are spaced apart from the data lines DL.

In an exemplary embodiment, as shown in FIG. 6A, the gate lines GL extend substantially in an X-axis direction and arranged substantially in a Y-axis direction. The gate lines GL provide the switching elements SW with a gate signal outputted from the gate driver 430, such that the switching elements SW are turned on. The gate lines GL may include at least one of aluminum (Al), aluminum (Al) alloy, molybdenum (Mo), molybdenum (Mo) alloy, chromium (Cr), chromium (Cr) alloy, tantalum (Ta), tantalum (Ta) alloy, titanium (Ti), titanium (Ti) alloy, tungsten (W), tungsten (W) alloy, copper (Cu), copper (Cu) alloy, silver (Ag) and silver (Ag) alloy, for example.

The data lines DL extend substantially in a Y-axis direction and arranged substantially in an X-axis direction. The data lines GL provide the switching elements SW with a data signal outputted from the data driver 420. In such an embodiment, when the switching elements SW are turned on, the data signal is transmitted to the pixel electrodes PE. The data lines DL may include at least one of aluminum (Al), aluminum (Al) alloy, molybdenum (Mo), molybdenum (Mo) alloy, chromium (Cr), chromium (Cr) alloy, tantalum (Ta), tantalum (Ta) alloy, titanium (Ti), titanium (Ti) alloy, tungsten (W), tungsten (W) alloy, copper (Cu), copper (Cu) alloy, silver (Ag) and silver (Ag) alloy, for example.

Each of the switching elements SW includes a control terminal (hereinafter, a gate electrode GE), an activation layer AP, an input terminal (hereinafter, a source electrode SE) and an output terminal (hereinafter, a drain electrode DE), which are connected to the gate line GL and the data line DL. In an exemplary embodiment, each of the switching elements SW may be a thin-film transistor ("TFT"). In an exemplary embodiment, the switching elements SW are described as TFTs having a bottom gate structure on which a gate electrode is disposed below a source electrode and a drain electrode; however, it is not limited thereto. In one alternative exemplary embodiment, for example, the switching elements SW may be TFTs having a top gate structure on which a gate electrode is disposed above a source electrode and a drain electrode.

After a metal or polysilicon doped with impurities at a high concentration is deposited, the gate electrodes GE may be provided, e.g., formed, by patterning the metal or the poly-silicon through a photolithography process and etching process using a mask.

The activation layer AP may include amorphous silicon or poly-silicon. The poly-silicon may be formed by crystallizing the amorphous silicon using laser, for example.

A gate insulation layer GIL is provided on the gate electrodes GE and the gate lines GL. The gate insulation layer may include a silicon dioxide (SiO2), a silicon nitride (SiN) or a laminated structure thereof.

A pixel electrode PE is electrically connected to a drain electrode DE of a switching element SW through a contact hole CNT formed through an organic layer OL including an organic material such as a polyimide ("PI") resin, a polyethersulfone ("PES") resin, a polyethyleneterephthalate ("PET") resin, a polyarylate ("PAR") resin and an acrylite resin, for example. The pixel electrode PE receives a data signal provided from the switching element SW. In an exemplary embodiment, the pixel electrode PE may be formed by depositing an optically transparent and electrically conductive material, such as indium tin oxide ("ITO") and indium zinc oxide ("IZO"), for example, on the gate insulation layer GIL, and then by patterning the optically transparent and electrically conductive material through a photolithography process and etching process using a mask.

A heating line HL is substantially parallel to a data line DL. When a power source is provided from the heat source providing part 140, the heating line HL emits heat. In an exemplary embodiment, the heating line HL may be provided simultaneously with the data line DL when the data line DL is provided. In such an embodiment, the heating line HL may include substantially the same material as the data line DL.

As described above, according to an exemplary embodiment, a heating line that induces a temperature increase of a liquid crystal layer, e.g., provides heat to the liquid crystal layer such that the temperature of the liquid crystal layer increases, is provided substantially parallel to a data line and in an area where buckling occurs, which is a buckled portion on curved liquid crystal display panel formed by combining and curving the upper and lower substrates, thereby increasing a temperature of the liquid crystal layer corresponding to the area of the buckling such that a refractive index difference in the liquid crystal layer is decreased. Thus, a refractive index difference is decreased when a cell gap of the liquid crystal layer is increased due to a buckling, thereby effectively preventing display defects such as displaying a yellowish color to enhance display characteristics.

Figure 7B:
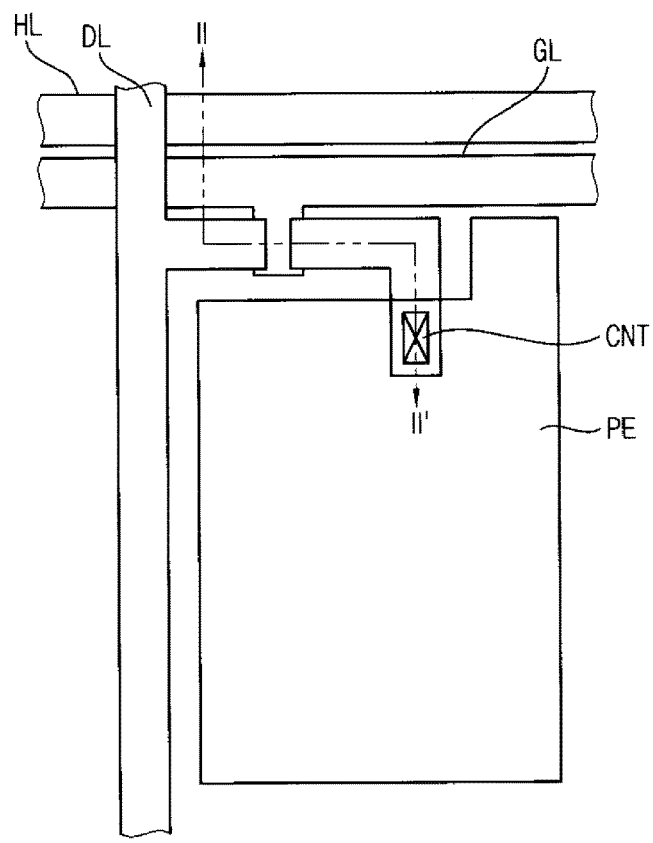
FIG. 7B is a plan view of a unit pixel of FIG. 7A.
Figure 7C:
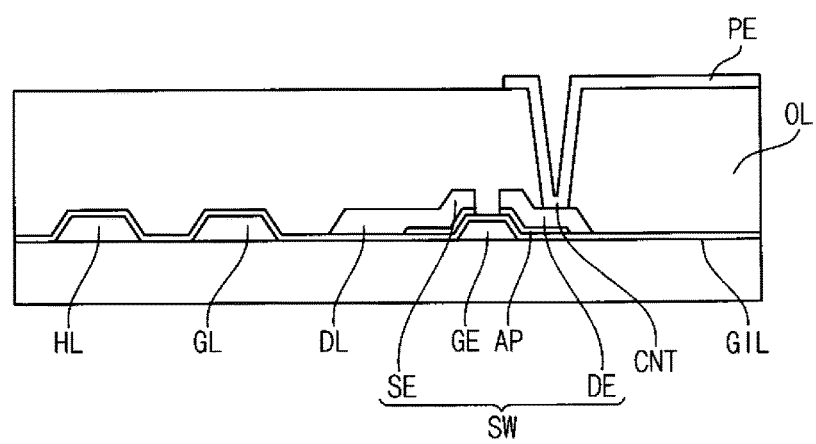
FIG. 7C is a cross-sectional view taken along line II-II' of the unit pixel of FIG. 7B.

FIG. 7A is a block diagram schematically showing an alternative exemplary embodiment of a curved liquid crystal display device according to the invention. FIG. 7B is a plan view of a unit pixel of FIG. 7A. FIG. 7C is a cross-sectional view taken along line II-II' of the unit pixel of FIG. 7B. In such an embodiment, a heating line and a gate line are disposed substantially parallel to each other.

Referring to FIG. 7A, an exemplary embodiment of a curved liquid crystal display device 200 according to the invention includes a curved liquid crystal display 210, a data driver 220, a gate driver 230 and a heat source providing part 240.

The curved liquid crystal display panel 210 includes a plurality of unit pixels and a plurality of heating lines HL disposed adjacent to the unit pixels. In FIG. 7A, a unit pixel hatched from a right-upper portion to a left-lower portion represents s a red color, a unit pixel hatched from a left-upper portion to a right-lower portion represents a green color, and a unit pixel hatched in a horizontal represents a red color.

In an exemplary embodiment, as shown in FIG. 7A, the heating lines HL extend substantially in a Y-axis direction and arranged along an X-axis direction. In such an embodiment, the heating lines HL are disposed on the curved liquid crystal display panel 210 with a substantially uniform interval therebetween. In an alternative exemplary embodiment, the heating lines HL may be disposed on a portion of the curved liquid crystal display panel 210. In such an embodiment, where an upper substrate and a lower substrate are combined to form the curved liquid crystal display panel 210, the heating line HL may be disposed in an area where buckling occurs. In such an embodiment, the heating line HL may be disposed on the lower substrate.

The data driver 220 outputs a data signal to a unit pixel of the curved liquid crystal display panel 210 to display an image.

The gate driver 230 outputs a gate signal to activate a switching element of the unit pixel disposed in the curved liquid crystal display panel 210.

The heat source providing part 240 provides a corresponding heating line HL with a power voltage to generate heat at the corresponding heating line HL on the curved liquid crystal display panel 210.

Referring to FIGS. 7B and 7C, a lower substrate of the curved liquid crystal display panel 210 includes a plurality of gate lines GL, a plurality of data lines DL crossing the gate lines GL, a plurality of switching elements SW connected to the gate lines GL and the data lines DL, a plurality of pixel electrodes PE respectively connected to the switching elements SW, and a plurality of heating lines HL extending substantially parallel to the data lines DL. The heating lines HL are spaced apart from the data lines DL.

In FIGS. 7B and 7C, the gate lines GL, the data lines DL, the switching elements SW and the pixel electrodes PE are substantially the same as the gate lines GL, the data lines DL, the switching elements SW and the pixel electrodes PE of the exemplary embodiment described with reference to FIGS. 6B and 6C, and thus any repetitive detailed description thereof will hereinafter be omitted.

The heating lines HL are disposed substantially parallel to the gate lines GL. As a power source is provided from the heat source providing part 240, the heating lines HL emit heat. In an exemplary embodiment, the heating lines HL may be provided simultaneously with the gate lines GL when the gate lines GL are provided. In such an embodiment, the heating lines HL include substantially the same material as the gate lines GL.

As described above, according to an exemplary embodiment, a heating line that induces a temperature increase of a liquid crystal layer is disposed substantially parallel to a gate line and in an area where buckling occurs, thereby increasing a temperature of a liquid crystal layer in an area of the buckling to decrease a refractive index difference of a liquid crystal layer therein. Thus, a refractive index difference is decreased when a cell gap of a liquid crystal layer is increased due to a buckling, thereby effectively preventing display defects such as displaying a yellowish color to enhance display characteristics.

Figure 8A:
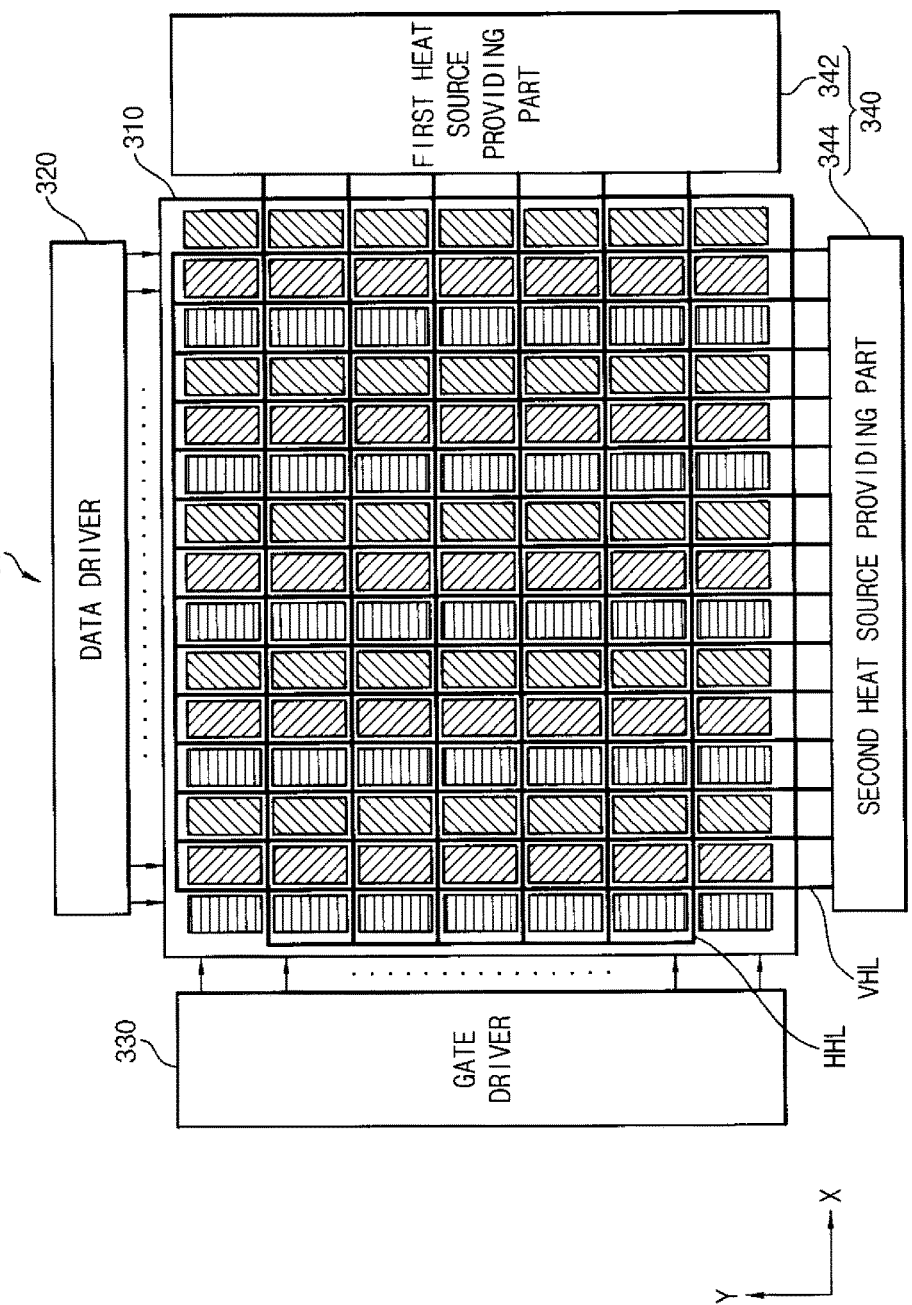
FIG. 8A is a block diagram schematically showing another alternative exemplary embodiment of a curved liquid crystal display device according to the invention.
Figure 8B:
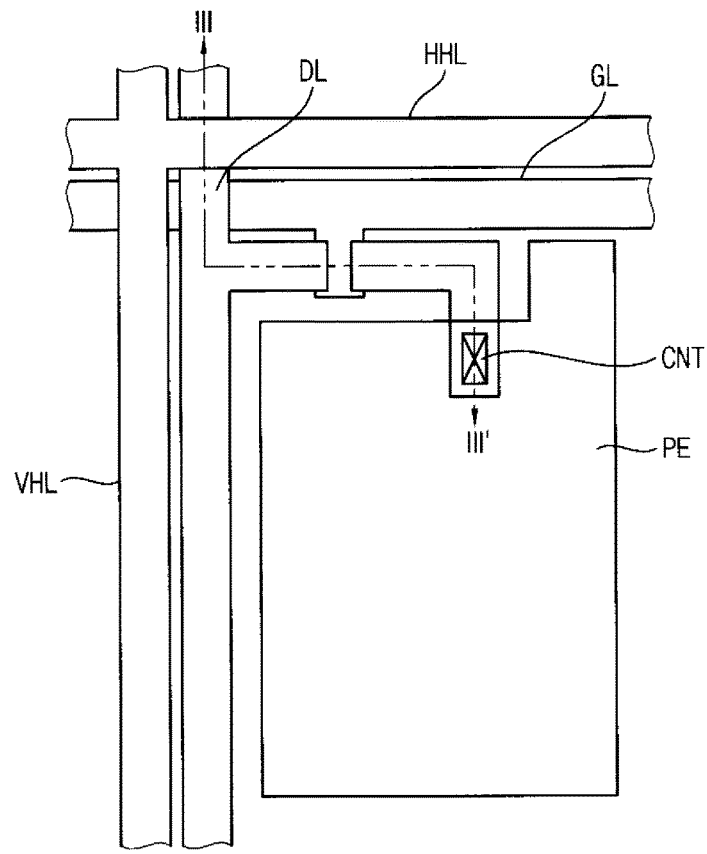
FIG. 8B is a plan view of a unit pixel of FIG. 8A.
Figure 8C:
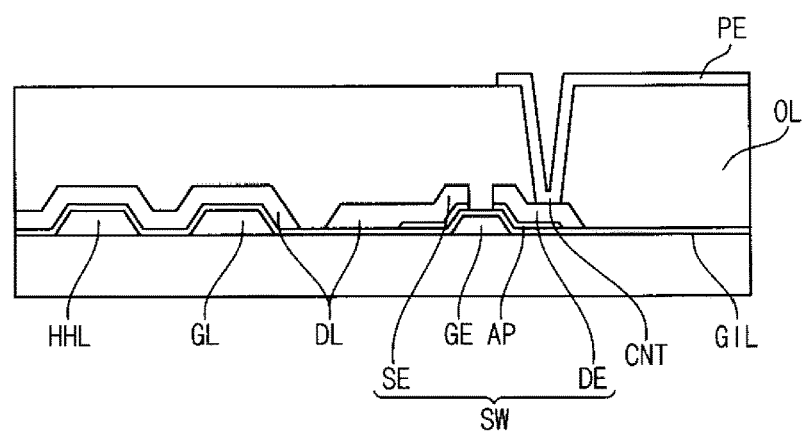
FIG. 8C is a cross-sectional view taken along line III-III' of the unit pixel of FIG. 8B.

FIG. 8A is a block diagram schematically showing another alternative exemplary embodiment of a curved liquid crystal display device according to the invention. FIG. 8B is a plan view of a unit pixel of FIG. 8A. FIG. 8C is a cross-sectional view taken along line III-III' of the unit pixel of FIG. 8B. In such an embodiment, a heating line is disposed substantially parallel to a data line and a gate line.

Referring to FIG. 8A, an exemplary embodiment of a curved liquid crystal display device 300 according to the invention includes a curved liquid crystal display 310, a data driver 320, a gate driver 330, a first heat source providing part 342 and a second heat source providing part 344.

The curved liquid crystal display panel 310 includes a plurality of unit pixels, a plurality of horizontal heating lines HHL disposed adjacent to the unit pixels and a plurality of vertical heating lines VHL disposed adjacent to the unit pixels. In FIG. 8A, a unit pixel hatched from a right-upper portion to a left-lower portion represents a red color, a unit pixel hatched from a left-upper portion to a right-lower portion represents a green color, and a unit pixel hatched in a horizontal represents a red color.

The horizontal heating lines HHL extend substantially in an X-axis direction and arranged along a Y-axis direction. The vertical heating lines VHL extend substantially in a Y-axis direction and arranged along an X-axis direction. In an exemplary embodiment, the horizontal and vertical heating lines HHL and VHL are disposed on the curved liquid crystal display panel 310 with a substantially uniform interval therebetween. In an alternative exemplary embodiment, the horizontal and vertical heating lines HHL and VHL may be disposed on a portion of the curved liquid crystal display panel 310. In such an embodiment, where an upper substrate and a lower substrate are combined to form the curved liquid crystal display panel 310, the horizontal and vertical heating lines HHL and VHL may be disposed in an area where buckling occurs. In such an embodiment, the horizontal and vertical heating lines HHL and VHL may be disposed on the lower substrate.

The data driver 320 outputs a data signal to a unit pixel of the curved liquid crystal display panel 310 to display an image.

The gate driver 330 outputs a gate signal to activate a switching element of the unit pixel disposed in the curved liquid crystal display panel 310.

The first heat source providing part 342 provides a corresponding horizontal heating line HHL with a power voltage to generate heat at the corresponding horizontal heating line HHL on the curved liquid crystal display panel 310.

The second heat source providing part 344 provides a corresponding vertical heating line VHL with a power voltage to generate heat at the corresponding vertical heating line VHL on the curved liquid crystal display panel 310.

Referring to FIGS. 8B and 8C, a lower substrate of the curved liquid crystal display panel 310 includes a plurality of gate lines GL, a plurality of data lines DL crossing the gate lines GL, a plurality of switching elements SW connected to the gate lines GL and the data lines DL, a plurality of pixel electrodes PE respectively connected to the switching elements SW, a plurality of horizontal heating lines HHL disposed substantially parallel to the gate line GL, and a vertical heating line VHL disposed substantially parallel to the data lines DL. The horizontal heating lines HHL are spaced apart from the gate lines GL, and the vertical heating lines VHL are spaced apart from the data lines DL.

In FIGS. 8B and 8C, the gate lines GL, the data lines DL, the switching elements SW and the pixel electrodes PE are substantially the same as the gate lines GL, the data lines DL, the switching elements SW and the pixel electrodes PE of the exemplary embodiment described with reference to FIGS. 6B and 6C, and any repetitive detailed description thereof will hereinafter be omitted.

The horizontal heating lines HHL are disposed substantially parallel to the gate lines GL. When a power source is provided from the heat source providing part 340, the horizontal heating lines HHL emit heat. In an exemplary embodiment, the horizontal heating lines HHL may be provided simultaneously with the gate lines GL when the gate lines GL are provided. In such an embodiment, the horizontal heating lines HHL include substantially the same material as the gate lines GL.

The vertical heating lines VHL are disposed substantially parallel to the data lines DL. As a power source is provided from the heat source providing part 340, the vertical heating lines VHL emit heat. In an exemplary embodiment, the vertical heating lines VHL may be provided simultaneously with the data lines DL when the data lines DL are provided. In such an embodiment, the vertical heating lines VHL include substantially the same material as the data lines DL.

As described above, according to an exemplary embodiment, a heating line that induces a temperature increase of a liquid crystal layer is disposed substantially parallel to a gate line and a data line and in an area where buckling occurs, thereby increasing a temperature of a liquid crystal layer corresponding to the area of the buckling to decrease a refractive index difference of a liquid crystal layer. Thus, a refractive index difference is decreased when a cell gap of a liquid crystal layer is increased due to a buckling, thereby effectively preventing display defects such as displaying a yellowish color to enhance display characteristics.

Figure 9B:
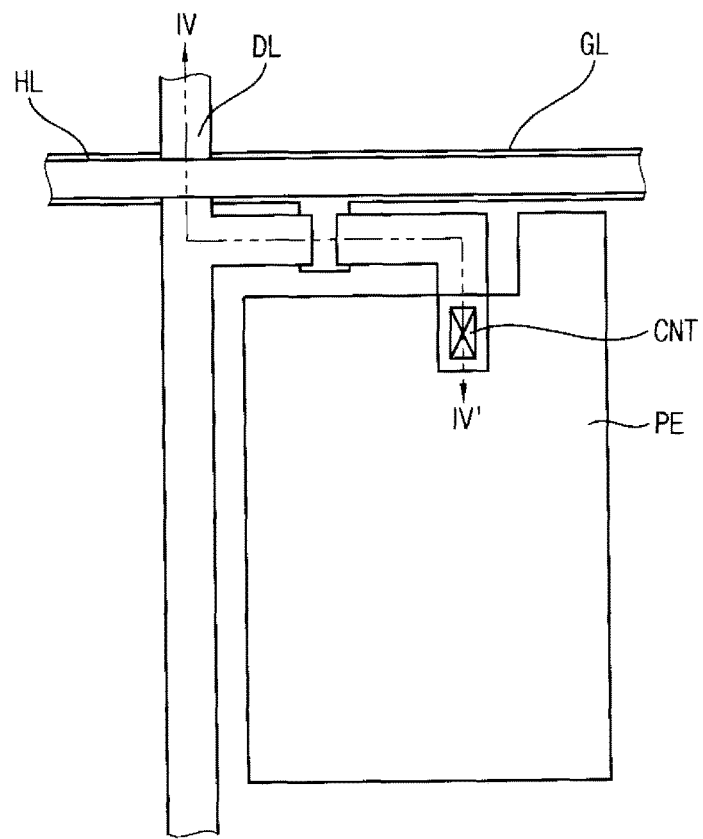
FIG. 9B is a plan view of a unit pixel of FIG. 9A.
Figure 9C:
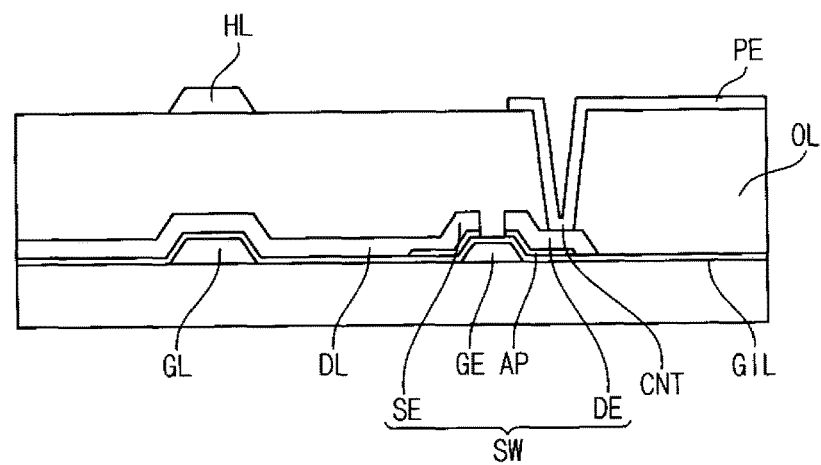
FIG. 9C is a cross-sectional view taken along line IV-IV' of the unit pixel of FIG. 9B.

FIG. 9A is a block diagram schematically showing another alternative exemplary embodiment of a curved liquid crystal display device according to the invention. FIG. 9B is a plan view showing a unit pixel of FIG. 9A. FIG. 9C is a cross-sectional view taken along line IV-IV' of the unit pixel of FIG. 9B. In such an embodiment, a heating line is disposed overlapping a gate line.

Referring to FIG. 9A, an exemplary embodiment of a curved liquid crystal display device 400 according to the invention includes a curved liquid crystal display 410, a data driver 420, a gate driver 430 and a heat source providing part 440.

The curved liquid crystal display panel 410 includes a plurality of unit pixels and a plurality of heating lines HL disposed adjacent to the unit pixels. In FIG. 9A, a unit pixel hatched from a right-upper portion to a left-lower portion represents a red color, a unit pixel hatched from a left-upper portion to a right-lower portion represents a green color, and a unit pixel hatched in a horizontal represents a red color.

The heating lines HL extend substantially in a Y-axis direction and arranged along an X-axis direction. In an exemplary embodiment, the heating lines HL are disposed on the curved liquid crystal display panel 410 with a substantially uniform interval therebetween. In an alternative exemplary embodiment, the heating lines HL may be disposed on a portion of the curved liquid crystal display panel 410. In such an embodiment, where an upper substrate and a lower substrate are combined to form the curved liquid crystal display panel 410, the heating line HL may be disposed in an area where buckling occurs. In such an embodiment, the heating line HL may be disposed on the lower substrate.

The data driver 420 outputs a data signal to a unit pixel of the curved liquid crystal display panel 410 to display an image.

The gate driver 430 outputs a gate signal to activate a switching element of the unit pixel disposed in the curved liquid crystal display panel 410.

The heat source providing part 440 provides a corresponding heating line HL with a power voltage to generate heat at the corresponding heating line HL on the curved liquid crystal display panel 410.

Referring to FIGS. 9B and 9C, a lower substrate of the curved liquid crystal display panel 410 includes a plurality of gate lines GL, a plurality of data lines DL crossing the gate lines GL, a plurality of switching elements SW connected to the gate lines GL and the data lines DL, a plurality of pixel electrodes PE respectively connected to the switching elements SW, and a plurality of heating lines HL disposed overlapping the gate lines GL.

The gate lines GL extend substantially in an X-axis direction and arranged along a Y-axis direction. The gate lines GL provide the switching elements SW with a gate signal outputted from the gate driver 430, such that the switching elements SW are turned on. The gate lines GL may include at least one of aluminum (Al), aluminum (Al) alloy, molybdenum (Mo), molybdenum (Mo) alloy, chromium (Cr), chromium (Cr) alloy, tantalum (Ta), tantalum (Ta) alloy, titanium (Ti), titanium (Ti) alloy, tungsten (W), tungsten (W) alloy, copper (Cu), copper (Cu) alloy, silver (Ag) and silver (Ag) alloy, for example.

The data lines DL extend substantially in a Y-axis direction and arranged along an X-axis direction. The data lines GL provide the switching elements SW with a data signal outputted from the data driver 420. In such an embodiment, when the switching elements SW are turned on, the data signal is transmitted to the pixel electrodes PE. The data lines DL may include at least one of aluminum (Al), aluminum (Al) alloy, molybdenum (Mo), molybdenum (Mo) alloy, chromium (Cr), chromium (Cr) alloy, tantalum (Ta), tantalum (Ta) alloy, titanium (Ti), titanium (Ti) alloy, tungsten (W), tungsten (W) alloy, copper (Cu), copper (Cu) alloy, silver (Ag) and silver (Ag) alloy, for example.

Each of the switching elements SW includes a gate electrode GE, an activation layer AP, a source electrode SE and a drain electrode DE, which are connected to a gate line GL and a data line DL. In an exemplary embodiment, each of the switching elements SW may be a TFT. In an exemplary embodiment, the switching elements SW are TFTs having a bottom gate structure on which a gate electrode is disposed below a source electrode and a drain electrode; however, it is not limited thereto. In one alternative exemplary embodiment, for example, each of the switching elements SW may be a TFT having a top gate structure.

In an exemplary embodiment, the gate electrode GE may be provided by depositing a metal or polysilicon doped with impurities at a high concentration and then by patterning the metal or the poly-silicon through a photolithography process and etching process using a mask.

The activation layer AP may include amorphous silicon or poly-silicon. In an exemplary embodiment, the poly-silicon may be provided by crystallizing the amorphous silicon using a laser, for example.

A gate insulation layer GIL is disposed on the gate electrodes GE and the gate lines GL. The gate insulation layer may include a silicon dioxide (SiO2), a silicon nitride (SiN) or a laminated structure thereof.

A pixel electrode PE is electrically connected to a drain electrode DE of a switching element SW through a contact hole CNT formed through an organic layer OL including an organic material such as a PI resin, a PES resin, a PET resin, a PAR resin and an acrylite resin, for example. The pixel electrode PE receives a data signal provided from the switching element SW. After an optically transparent and electrically conductive material, such as ITO and IZO, for example, is deposited on the gate insulation layer GIL, the optically transparent and electrically conductive material is patterned through a photolithography process and etching process using a mask such that the pixel electrode PE may be formed on the gate insulation layer GIL.

The heating lines HL are disposed on the organic layer OL overlapping the gate lines GL. As a power source is provided from the heat source providing part 440, the heating lines HL emit heat. In an exemplary embodiment, the heating lines HL may be provided simultaneously with the pixel electrodes PE when the pixel electrodes PE are provided. In such an embodiment, the heating lines HL include substantially the same material as the pixel electrodes PE. In an alternative exemplary embodiment, the heating lines HL may include substantially the same material as the gate lines GL. In another alternative exemplary embodiment, the heating lines HL may include substantially the same material as the data lines DL.

As described above, according to an exemplary embodiment, a heating line that induces a temperature increase of a liquid crystal layer is disposed overlapping a gate line and in an area where buckling occurs, thereby increasing a temperature of a liquid crystal layer corresponding to the area of the buckling to decrease a refractive index difference of a liquid crystal layer. Thus, a refractive index difference is decreased when a cell gap of a liquid crystal layer is increased due to a buckling, thereby effectively preventing display defects such as displaying a yellowish color to enhance display characteristics.

Figure 10B:
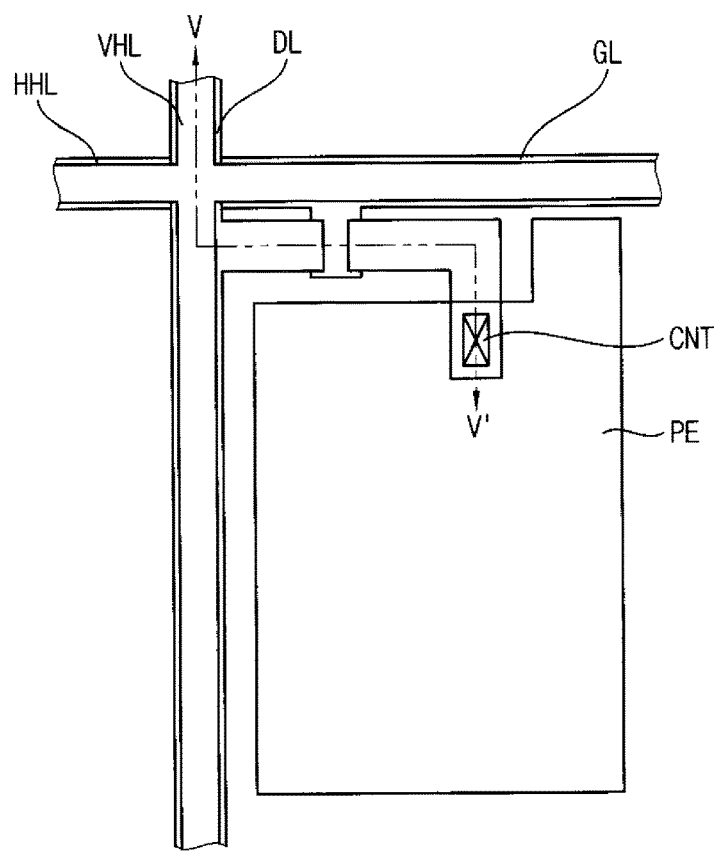
FIG. 10B is a plan view of a unit pixel of FIG. 10A.
Figure 10C:
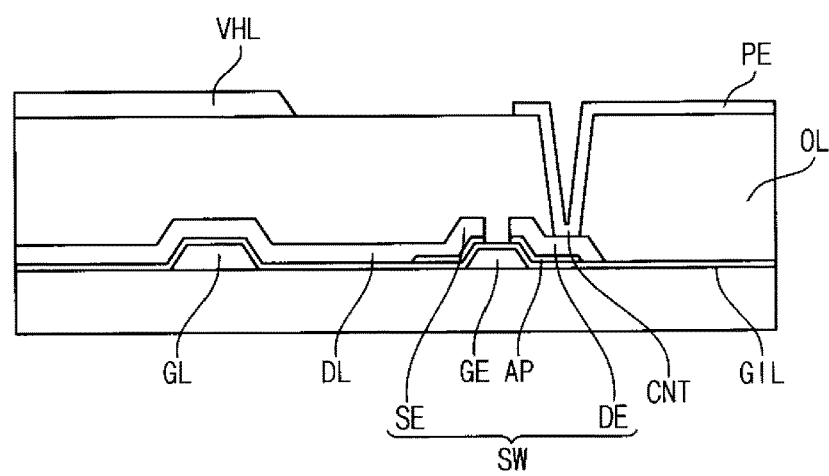
FIG. 10C is a cross-sectional view taken along line V-V' of the unit pixel of FIG. 10B.

FIG. 10A is a block diagram schematically showing another alternative exemplary embodiment of a curved liquid crystal display device according to the invention. FIG. 10B is a plan view of a unit pixel of FIG. 10A. FIG. 10C is a cross-sectional view taken along line V-V' of the unit pixel of FIG. 10B. In such an embodiment, a heating line dis disposed overlapping a data line and a gate line.

Referring to FIG. 10A, an exemplary embodiment of a curved liquid crystal display device 500 according to the invention includes a curved liquid crystal display 510, a data driver 520, a gate driver 530, a first heat source providing part 542 and a second heat source providing part 544.

The curved liquid crystal display panel 510 includes a plurality of unit pixels, a plurality of horizontal heating line HHL disposed adjacent to the unit pixels and a plurality of vertical heating lines VHL disposed adjacent to the unit pixels. In FIG. 10A, a unit pixel hatched from a right-upper portion to a left-lower portion represents a red color, a unit pixel hatched from a left-upper portion to a right-lower portion represents a green color, and a unit pixel hatched in a horizontal represents a red color.

The horizontal heating lines HHL extend substantially in an X-axis direction and arranged along a Y-axis direction. The vertical heating lines VHL extend substantially in a Y-axis direction and arranged along an X-axis direction. In an exemplary embodiment, the horizontal heating lines HHL and the vertical heating line VHL are disposed on the curved liquid crystal display panel 510 with a substantially uniform interval therebetween. In an alternative exemplary embodiment, the horizontal heating lines HHL and the vertical heating line VHL may be disposed on a portion of the curved liquid crystal display panel 510. In such an embodiment, when an upper substrate and a lower substrate are combined to form the curved liquid crystal display panel 510, the horizontal heating lines HHL and the vertical heating lines VHL may be disposed in an area where buckling occurs. In such an embodiment, the horizontal heating lines HHL and the vertical heating lines VHL may be disposed on the lower substrate.

The data driver 520 outputs a data signal to a unit pixel of the curved liquid crystal display panel 510 to display images.

The gate driver 530 outputs a gate signal to activate a switching element of the unit pixel disposed in the curved liquid crystal display panel 510.

The first heat source providing part 542 provides a corresponding horizontal heating line HHL with a power voltage to generate heat at the corresponding horizontal heating line HHL on the curved liquid crystal display panel 510.

The second heat source providing part 544 provides a corresponding vertical heating line VHL with a power voltage to generate heat at the corresponding vertical heating line VHL on the curved liquid crystal display panel 510.

Referring to FIGS. 10B and 10C, a lower substrate of the curved liquid crystal display panel 510 includes a plurality of gate lines GL, a plurality of data lines DL crossing the gate lines GL, a plurality of switching elements SW connected to the gate lines GL and the data lines DL, a plurality of pixel electrodes PE respectively connected to the switching elements SW, a plurality of horizontal heating lines HHL disposed overlapping the gate lines GL, and a plurality of vertical heating lines VHL disposed overlapping the data lines DL.

In FIGS. 10B and 10C, the gate lines GL, the data lines DL, the switching elements SW and the pixel electrodes PE may be substantially the same as the gate lines GL, the data lines DL, the switching elements SW and the pixel electrodes PE of the exemplary embodiment described with reference to FIGS. 6B and 6C, and thus any repetitive detailed description thereof may hereinafter be omitted.

The horizontal heating lines HHL overlap the gate lines GL. As a power source is provided from the heat source providing part 540, the horizontal heating lines HHL emit heat.

The vertical heating lines VHL overlap the data lines DL. As a power source is provided from the heat source providing part 540, the vertical heating lines VHL emit heat.

In an exemplary embodiment, the horizontal heating lines HHL and the vertical heating lines VHL may be disposed on an organic layer OL.

As described above, according to an exemplary embodiment, a heating line that induces a temperature increase of a liquid crystal layer is disposed overlapping a gate line and a data line and in an area where buckling occurs, thereby increasing a temperature of a liquid crystal layer corresponding to the area of the buckling to decrease a refractive index difference of a liquid crystal layer. Thus, a refractive index difference is decreased when a cell gap of a liquid crystal layer is increased due to a buckling, thereby effectively preventing display defects such as displaying a yellowish color to enhance display characteristics.

Figure 11A:
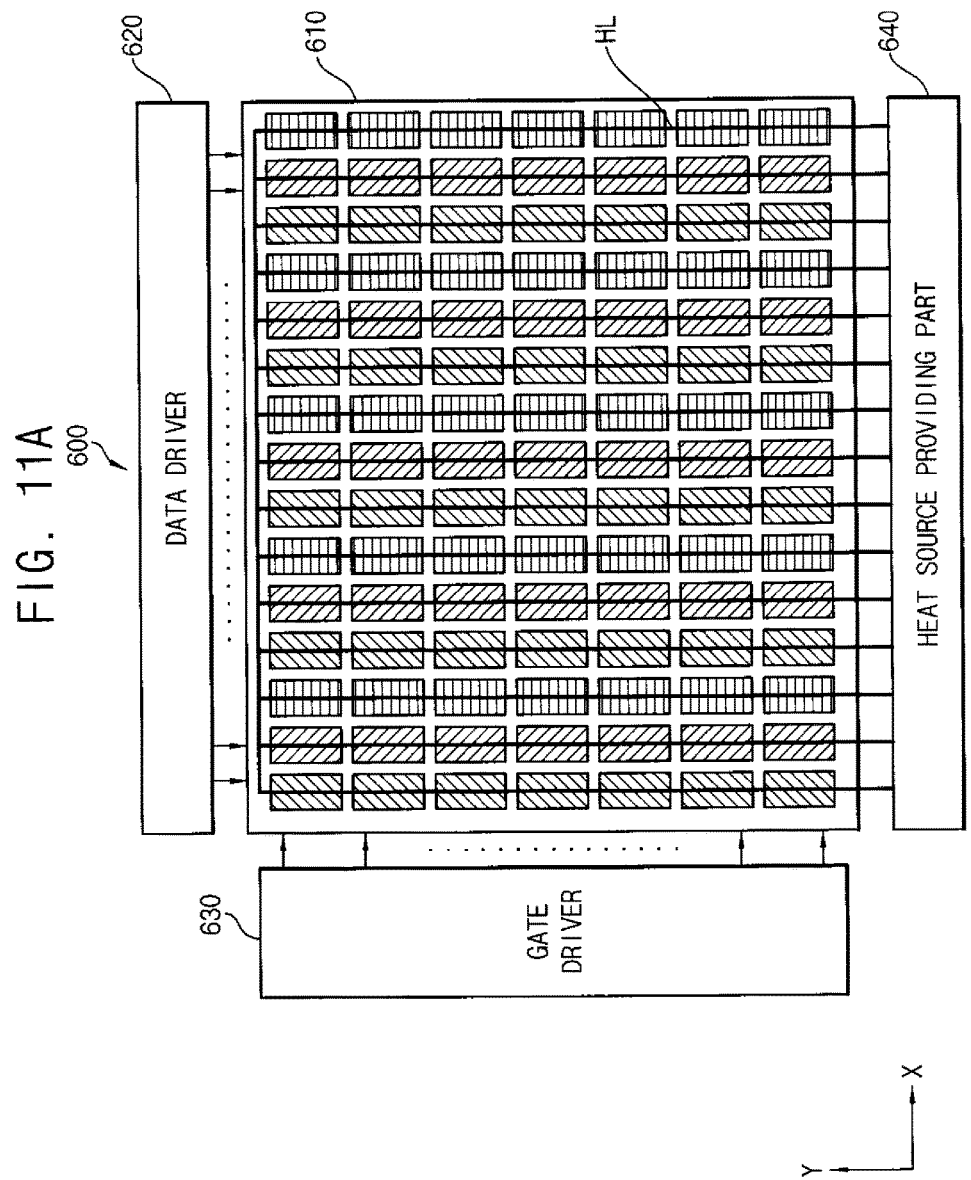
FIG. 11A is a plan view schematically showing still another alternative exemplary embodiment of a curved liquid crystal display device according to the invention.
Figure 11B:
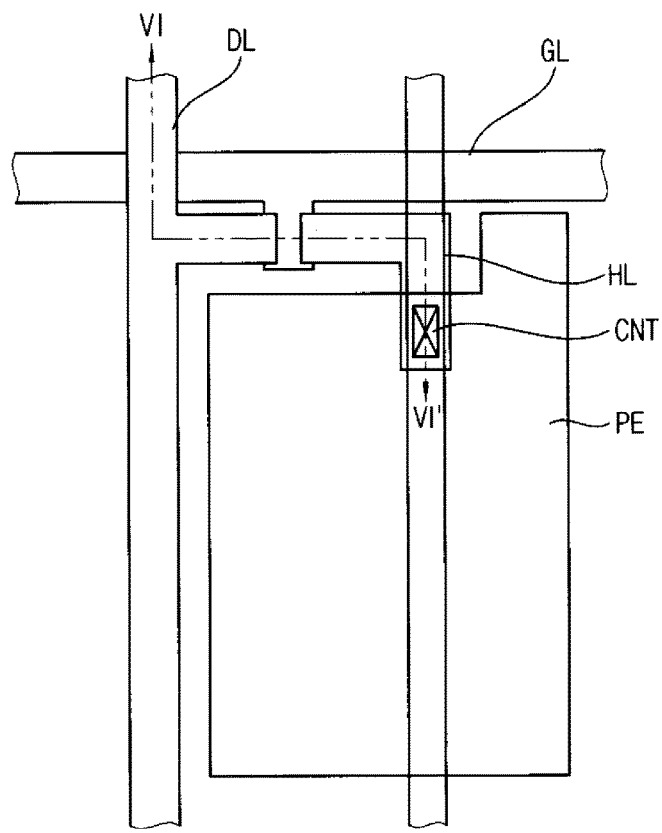
FIG. 11B is a plan view of a unit pixel of FIG. 11A.
Figure 11C:
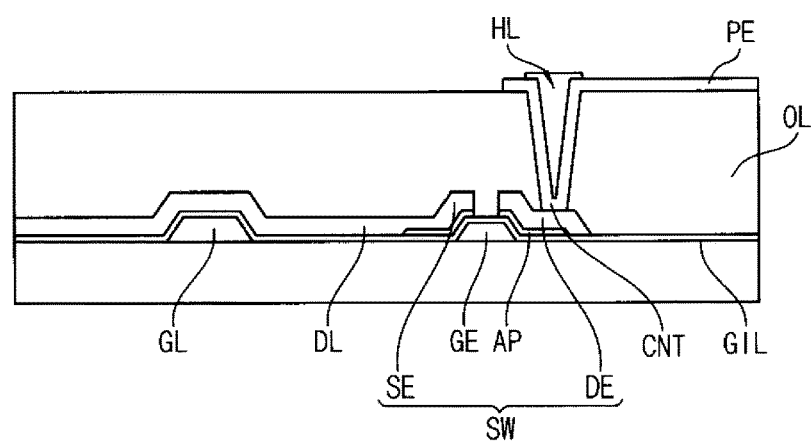
FIG. 11C is a cross-sectional view taken along line VI-VI' of the unit pixel of FIG. 11B.

FIG. 11A is a bock diagram schematically showing another alternative exemplary embodiment of a curved liquid crystal display device according to the invention. FIG. 11B is a plan view of a unit pixel of FIG. 11A. FIG. 11C is a cross-sectional view taken along line VI-VI' of the unit pixel of FIG. 11B. In such an embodiment, a heating line and a data line are disposed substantially parallel to each other and the heating line overlaps a pixel electrode.

Referring to FIG. 11A, an exemplary embodiment of a curved liquid crystal display device 600 according to the invention includes a curved liquid crystal display panel 610, a data driver 620, a gate driver 630 and a heat source providing part 640.

The curved liquid crystal display panel 610 includes a plurality of unit pixels and a plurality of heating lines HL disposed adjacent to the unit pixels. In FIG. 11A, a unit pixel hatched from a right-upper portion to a left-lower portion represents a red color, a unit pixel hatched from a left-upper portion to a right-lower portion represents a green color, and a unit pixel hatched in a horizontal represents a red color.

The heating lines HL extend substantially in a Y-axis direction and arranged along an X-axis direction. In an exemplary embodiment, the heating lines HL are disposed on the curved liquid crystal display panel 610 with a substantially uniform interval therebetween. In an alternative exemplary embodiment, the heating lines HL may be disposed on a portion of the curved liquid crystal display panel 610. In such an embodiment, when an upper substrate and a lower substrate are combined to form the curved liquid crystal display panel 610, the heating lines HL may be disposed in an area where buckling occurs. In such an embodiment, the heating lines HL may be disposed on the lower substrate.

The data driver 620 outputs a data signal to a unit pixel of the curved liquid crystal display panel 610 to display an image.

The gate driver 630 outputs a gate signal to activate a switching element of the unit pixel disposed in the curved liquid crystal display panel 610.

The heat source providing part 640 provides a corresponding heating line HL with a power voltage to generate heat at the corresponding heating line HL on the curved liquid crystal display panel 610.

Referring to FIGS. 11B and 11C, a lower substrate of the curved liquid crystal display panel 610 includes a plurality of gate lines GL, a plurality of data lines DL crossing the gate lines GL, a plurality of switching elements SW connected to the gate lines GL and the data lines DL, a plurality of pixel electrodes PE respectively connected to the switching elements SW, and a plurality of heating lines HL disposed substantially parallel to the data lines DL and overlapping the pixel electrodes PE.

In FIGS. 11B and 11C, the gate lines GL, the data lines DL, the switching elements SW and the pixel electrodes PE may be substantially the same as the gate lines GL, the data lines DL, the switching elements SW and the pixel electrodes PE of the exemplary embodiment described with reference to FIGS. 6B and 6C, and thus any repetitive detailed description thereof may hereinafter be omitted.

A heating line HL covers a contact hole CNT electrically connected to a drain electrode DE of a switching element SE and a pixel electrode PE. As a power source is provided from the heat source providing part 640, the heating line HL emits heat. In an exemplary embodiment, the heating line HL may be provided after the pixel electrode PE is provided. The heating line HL may include at least one of aluminum (Al), aluminum (Al) alloy, molybdenum (Mo), molybdenum (Mo) alloy, chromium (Cr), chromium (Cr) alloy, tantalum (Ta), tantalum (Ta) alloy, titanium (Ti), titanium (Ti) alloy, tungsten (W), tungsten (W) alloy, copper (Cu), copper (Cu) alloy, silver (Ag) and silver (Ag) alloy, for example.

As described above, according to an exemplary embodiment, a heating line that induces a temperature increase of a liquid crystal layer is disposed substantially parallel to a data line and overlapping a pixel electrode and in an area where buckling occurs, thereby increasing a temperature of a liquid crystal layer corresponding to the area of the buckling to decrease a refractive index difference of a liquid crystal layer. Thus, a refractive index difference is decreased when a cell gap of a liquid crystal layer is increased due to a buckling, thereby effectively preventing display defects such as displaying a yellowish color to enhance display characteristics.

Figure 12B:
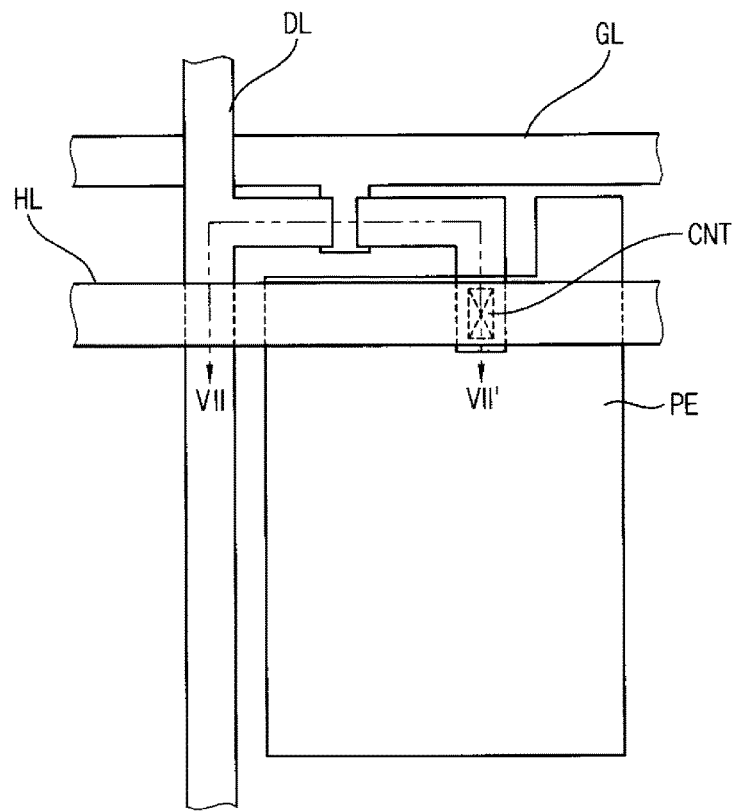
FIG. 12B is a plan view of a unit pixel of FIG. 12A.
Figure 12C:
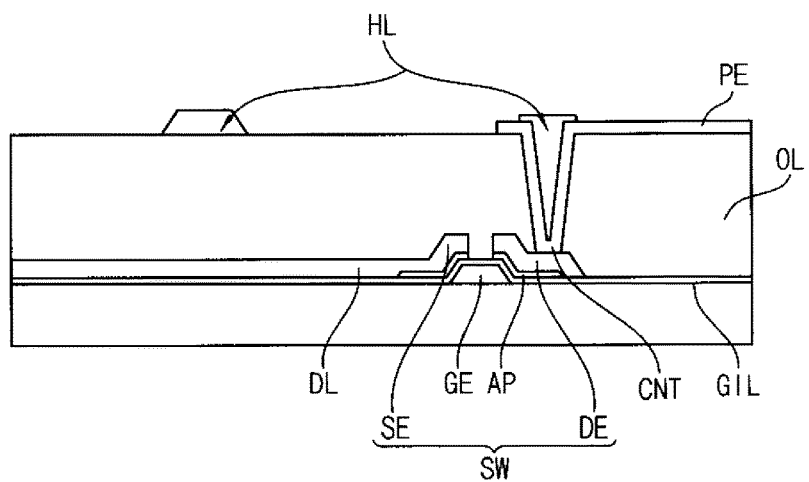
FIG. 12C is a cross-sectional view taken along line VII-VII' of the unit pixel of FIG. 12B.

FIG. 12A is a block diagram schematically showing another alternative exemplary embodiment of a curved liquid crystal display device according to the invention. FIG. 12B is a plan view of a unit pixel of FIG. 12A. FIG. 12C is a cross-sectional view taken along line VII-VII' of the unit pixel of FIG. 12B. In such an embodiment, a heating line and a gate line are disposed substantially parallel to each other, and the heating line overlaps a pixel electrode.

Referring to FIG. 12A, an exemplary embodiment of a curved liquid crystal display device 700 according to the invention includes a curved liquid crystal display panel 710, a data driver 720, a gate driver 730 and a heat source providing part 740.

The curved liquid crystal display panel 710 includes a plurality of unit pixels and a plurality of heating lines HL disposed adjacent to the unit pixels. In FIG. 12A, a unit pixel hatched from a right-upper portion to a left-lower portion represents a red color, a unit pixel hatched from a left-upper portion to a right-lower portion represents a green color, and a unit pixel hatched in a horizontal represents a red color.

The heating lines HL extend substantially in an X-axis direction and arranged along a Y-axis direction. In an exemplary embodiment, the heating lines HL are disposed on the curved liquid crystal display panel 710 with a substantially uniform interval therebetween. In an alternative exemplary embodiment, the heating lines HL may be disposed on a portion of the curved liquid crystal display panel 710. In such an embodiment, when an upper substrate and a lower substrate are combined to form the curved liquid crystal display panel 710, the heating lines HL may disposed in an area where buckling occurs. In such an embodiment, the heating lines HL may be disposed on the lower substrate.

The data driver 720 outputs a data signal to a unit pixel of the curved liquid crystal display panel 710 to display an image.

The gate driver 730 outputs a gate signal to activate a switching element of the unit pixel disposed in the curved liquid crystal display panel 710.

The heat source providing part 740 provides a corresponding heating line HL with a power voltage to generate heat at the corresponding heating line HL on the curved liquid crystal display panel 710.

Referring to FIGS. 12B and 12C, a lower substrate of the curved liquid crystal display panel 710 includes a plurality of gate lines GL, a plurality of data lines DL crossing the gate lines GL, a plurality of switching elements SW connected to the gate lines GL and the data lines DL, a plurality of pixel electrodes PE respectively connected to the switching elements SW, and a plurality of heating lines HL disposed substantially parallel to the gate lines GL and overlapping the pixel electrodes PE.

In FIGS. 12B and 12C, the gate lines GL, the data lines DL, the switching elements SW and the pixel electrodes PE may be substantially the same as the gate lines GL, the data lines DL, the switching elements SW and the pixel electrodes PE of the exemplary embodiment described with reference to FIGS. 6B and 6C, and thus any repetitive detailed description thereof may hereinafter be omitted.

A heating line HL is disposed covering a contact hole CNT electrically connected to a drain electrode DE of the switching element SE and the pixel electrode PE. As a power source is provided from the heat source providing part 740, the heating line HL emits heat. In an exemplary embodiment, the heating line HL may be provided after the pixel electrode PE is provided. The heating line HL may include at least one of aluminum (Al), aluminum (Al) alloy, molybdenum (Mo), molybdenum (Mo) alloy, chromium (Cr), chromium (Cr) alloy, tantalum (Ta), tantalum (Ta) alloy, titanium (Ti), titanium (Ti) alloy, tungsten (W), tungsten (W) alloy, copper (Cu), copper (Cu) alloy, silver (Ag) and silver (Ag) alloy, for example.

As described above, according to an exemplary embodiment, a heating line that induces a temperature increase of a liquid crystal layer is disposed substantially parallel to a gate line and overlapping a pixel electrode and in an area where buckling occurs, thereby increasing a temperature of a liquid crystal layer corresponding to the area of the buckling to decrease a refractive index difference of a liquid crystal layer. Thus, a refractive index difference is decreased when a cell gap of a liquid crystal layer is increased due to a buckling, thereby effectively preventing display defects such as displaying a yellowish color to enhance display characteristics.

In an exemplary embodiment, the heating lines are disposed on a lower substrate (e.g., an array substrate) of a curved liquid crystal display panel. In an alternative exemplary embodiment, the heating lines may be disposed on an upper substrate (e.g., a color filter substrate) of the curved liquid crystal display panel.

Figure 13A:
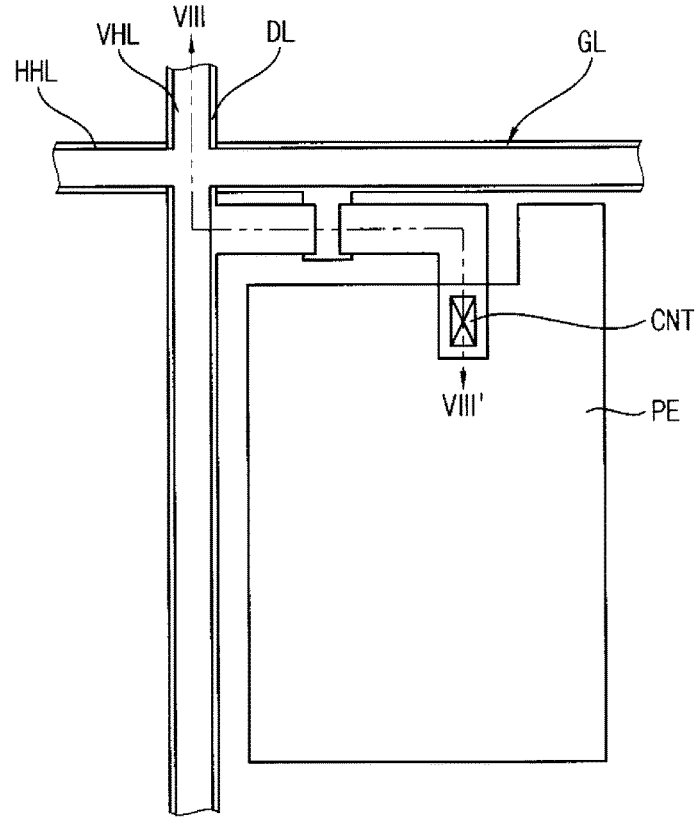
FIG. 13A is a plan view of a unit pixel of still another alternative exemplary embodiment of a liquid crystal display panel according to the invention.
Figure 13B:
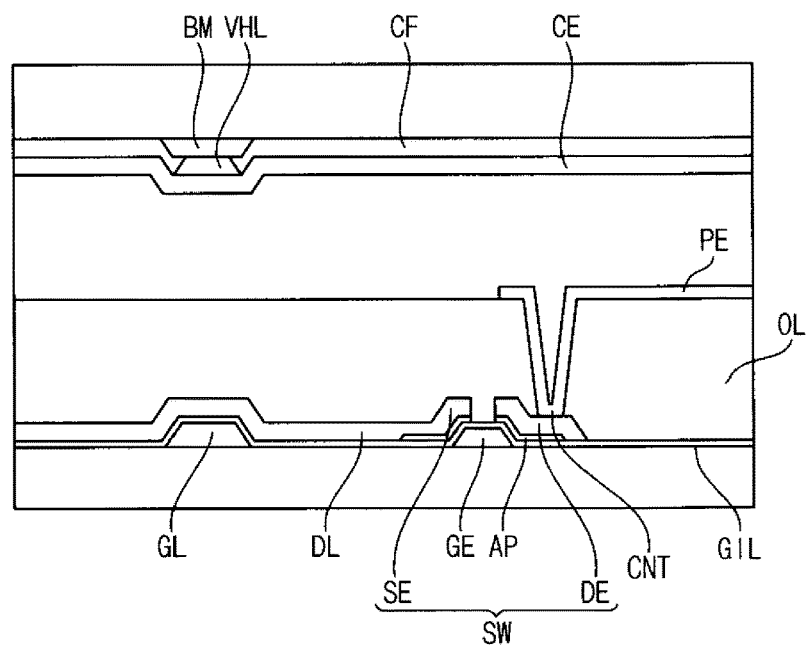
FIG. 13B is a cross-sectional view taken along line VIII-VIII' of the unit pixel of FIG. 13A.

FIG. 13A is a plan view of a unit pixel of another alternative exemplary embodiment of a liquid crystal display panel according to the invention. FIG. 13B is a cross-sectional view taken along line VIII-VIII' of the unit pixel of FIG. 13A. In such an embodiment, a heating line is disposed overlapping a black matrix layer.

Referring to FIGS. 13A and 13B, an exemplary embodiment of a curved liquid crystal display panel according to the invention includes a lower substrate and an upper substrate.

The lower substrate includes a plurality of gate lines GL, a plurality of data lines DL crossing the gate lines GL, a plurality of switching elements SW connected to the gate lines GL and the data lines DL, and a plurality of pixel electrodes PE respectively connected to the switching elements SW.

In FIGS. 13B and 13C, the gate lines GL, the data lines DL, the switching elements SW and the pixel electrodes PE may be substantially the same as the gate lines GL, the data lines DL, the switching elements SW and the pixel electrodes PE of the exemplary embodiment described with reference to FIGS. 6B and 6C, and thus any repetitive detailed description thereof may hereinafter be omitted.

The upper substrate includes a black matrix layer BM disposed on a substrate having an optically transparent and electrically insulating property, a color filter layer CF disposed on an area defined by the black matrix layer BM, a plurality of horizontal heating lines HHL overlapping the black matrix layer BM, a plurality of vertical heating lines VHL overlapping the black matrix layer BM, and a common electrode layer CE covering the horizontal and vertical heating lines HHL and VHL and the color filter layer CF.

The horizontal heating lines HHL extend substantially in an X-axis direction and arranged along a Y-axis direction. As a power source is provided from an external heat source providing part (not shown), the horizontal heating lines HHL emit heat.

The vertical heating lines VHL extend substantially in a Y-axis direction and arranged along an X-axis direction. As a power source is provided from an external heat source providing part (not shown), the vertical heating lines VHL emit heat.

The horizontal and vertical heating lines HHL and VHL may include at least one of aluminum (Al), aluminum (Al) alloy, molybdenum (Mo), molybdenum (Mo) alloy, chromium (Cr), chromium (Cr) alloy, tantalum (Ta), tantalum (Ta) alloy, titanium (Ti), titanium (Ti) alloy, tungsten (W), tungsten (W) alloy, copper (Cu), copper (Cu) alloy, silver (Ag) and silver (Ag) alloy, for example.

As described above, according to an exemplary embodiment, a heating line that induces a temperature increase of a liquid crystal layer is disposed overlapping a black matrix layer and in an area where buckling occurs, thereby increasing a temperature of a liquid crystal layer corresponding to the area of the buckling to decrease a refractive index difference of a liquid crystal layer. Thus, a refractive index difference is decreased when a cell gap of a liquid crystal layer is increased due to a buckling, thereby effectively preventing display defects such as displaying a yellowish color to enhance display characteristics.

Figure 14:
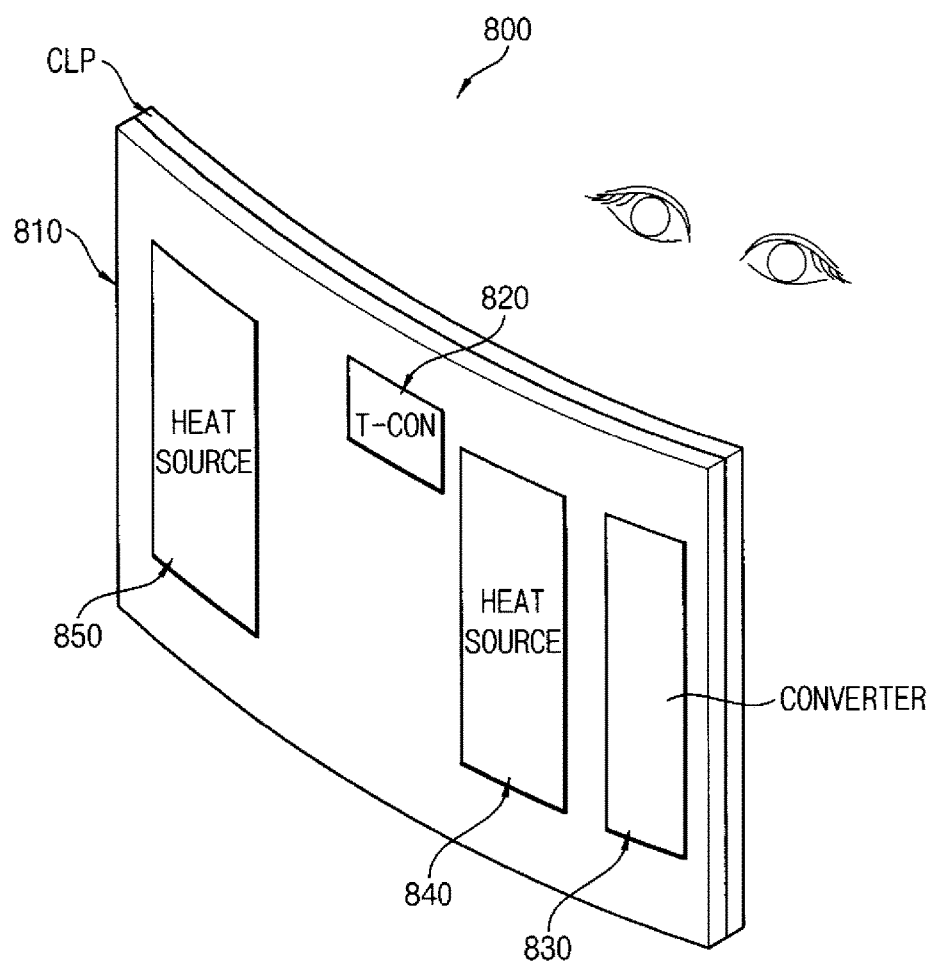
FIG. 14 is a rear perspective view of still another alternative exemplary embodiment of a curved liquid crystal display device according to the invention.

FIG. 14 is a rear perspective view schematically illustrating another alternative exemplary embodiment of a curved liquid crystal display device 800 according to the invention. In such an embodiment, a heat source is disposed, e.g., attached, on a rear surface of a backlight unit.

Referring to FIG. 14, an exemplary embodiment of a curved liquid crystal display device 800 according to the invention includes a curved liquid crystal display panel CLP and a backlight unit 810 disposed at a rear surface of the curved liquid crystal display panel CLP to provide light to the curved liquid crystal display panel CLP.

A timing controller (T-CON) 820, a converter 830, a first heat source 840 and a second heat source 850 are disposed, e.g., attached, on a rear surface of the backlight unit 810.

The timing controller 820 may be configured in a printed circuit board in which a plurality of chips for driving the curved liquid crystal display panel CLP is disposed, e.g., mounted.

The converter 830 may be configured in a printed circuit board in which a plurality of chips for providing power source to the curved liquid crystal display panel CLP or the backlight unit 810 are disposed, e.g., mounted.

The first heat source 840 is disposed at a first side portion of a rear surface of the backlight unit 810 in a portion where buckling occurs due to a bending of the curved liquid crystal display panel CLP. In one exemplary embodiment, for example, the first heat source 840 is disposed substantially parallel to a short side of the curved liquid crystal display panel CLP to emit heat. The emitted heat is provided to the curved liquid crystal display panel CLP to induce a temperature increase of a liquid crystal layer.

The second heat source 850 is disposed at a second side portion of the rear surface of the backlight unit 810 in a portion where buckling occurs in accordance with the bending of the curved liquid crystal display panel CLP. In one exemplary embodiment, for example, the second heat source 850 is attached substantially parallel to a short side of the curved liquid crystal display panel CLP to emit heat. The emitted heat is provided to the curved liquid crystal display panel CLP to induce a temperature increase of a liquid crystal layer.

Grooves (not shown) may be further formed through a rear surface of the backlight unit 810, such that heat generated at each of the first and second heat sources 840 and 850 are effectively provided to the curved liquid crystal display panel CLP. In one exemplary embodiment, for example, the grooves are formed through a bottom chassis of the backlight unit 810, such that each of the first and second heat sources 840 and 850 may be received in the grooves.

In an exemplary embodiment, each of the first and second heat sources 840 and 850 may be a film including a reference layer (e.g., plastic or glass) and a carbon nanotube ("CN") or ITO film-deposited on the reference layer. In such an embodiment, CN or ITO is an electric conductor.

In one exemplary embodiment, for example, a CN or an ITO is film-deposited on a reference layer and a polymer material is provided to cover the CN or the ITO, such that each of the first and second heat sources 840 and 850 are manufactured. In another exemplary embodiment, for example, a CN or an ITO is film-deposited on a first surface of a reference layer and a polymer material is provided on a second surface of the reference layer, such that each of the first and second heat sources 840 and 850 are manufactured.

Surfaces of the first and second heat sources 840 and 850, which are film-deposited by a CN or an ITO, are positioned toward a liquid crystal layer, such that the liquid crystal layer is heated.

Electrodes (not shown) may be disposed, e.g., attached, at two end portions of the first and second heat sources 840 and 850. A voltage difference is generated at each two end portions of the first and second heat sources 840 and 850 due to the electrodes, and current is flowing each of the first and second heat sources 840 and 850 due to the voltage difference. When current is flowing each of the first and second heat sources 840 and 850, heat is emitted.

A method of delivering heat to a liquid crystal layer in each of the first and second heat sources 840 and 850 may include various methods such as radiation, conduction and convection, for example.

The temperature of a liquid crystal layer relatively near to the first heat source 840 is higher than the temperature of a liquid crystal layer relatively far from the first heat source 840. The temperature of a liquid crystal layer relatively near to the second heat source 850 is higher than that of a liquid crystal layer relatively far from the second heat source 850. When a cell gap of a liquid crystal layer is increased in accordance with a portion where buckling occurs, a temperature of a corresponding portion is increased such that refractive index difference of a liquid crystal layer is decreased. Accordingly, the refractive index difference is decreased by the increasing of the cell gap, such that a phase difference of a liquid crystal layer is substantially uniformly maintained, and a yellowish image is thereby effectively prevented from being generated.

As described above, according to an exemplary embodiment, a heat source that induces a temperature increase of a liquid crystal layer is disposed at a rear surface of a backlight unit and in an area where buckling occurs, thereby increasing a temperature of the liquid crystal layer corresponding to the area of the buckling to decrease a refractive index difference of the liquid crystal layer. Thus, a refractive index difference is decreased when a cell gap of the liquid crystal layer is increased due to a buckling, thereby effectively preventing display defects such as displaying a yellowish color to enhance display characteristics.

Figure 15:
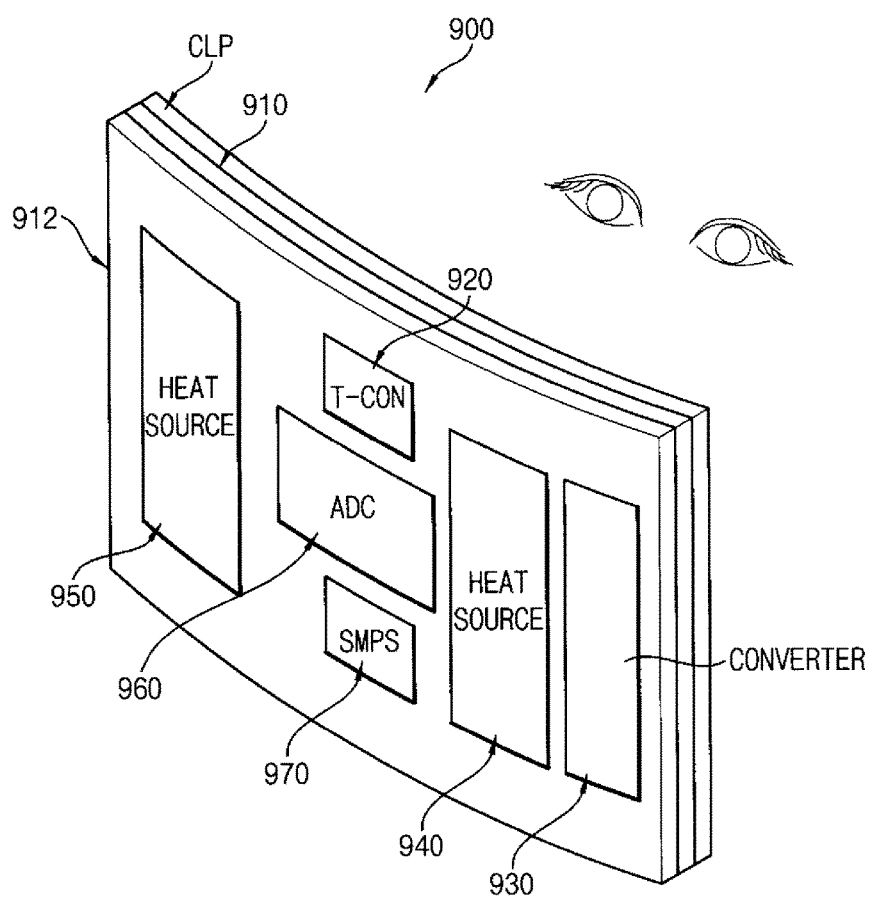
FIG. 15 is a rear perspective view of still another alternative exemplary embodiment of a curved liquid crystal display device according to the invention.

FIG. 15 is a rear perspective view schematically illustrating another alternative exemplary embodiment of a curved liquid crystal display device according to the invention. In such an embodiment, a heat source is disposed on a rear surface of a rear case of a curved liquid crystal display device.

Referring to FIG. 15, an exemplary embodiment of a curved liquid crystal display device 900 according to the invention includes a curved liquid crystal display panel CLP, a backlight unit 910 disposed at a rear surface of the curved liquid crystal display panel CLP to provide the curved liquid crystal display panel CLP with light, and a rear case 912 that receives the curved liquid crystal display panel CLP and the backlight unit 910. The curved liquid crystal display device 900 may further include a front case (not shown). The front case may be coupled with the rear case 912 to receive the curved liquid crystal display panel CLP and the backlight unit 910.

A timing controller 920, a converter 930, a first heat source 940, a second heat source 950, an analog-digital converter ("ADC") 960 and a switch-mode power supply ("SMPS") 970 are disposed, e.g., attached, on a rear surface of the rear case 912.

The timing controller 920 may be configured in a printed circuit board on which a plurality of chips for driving the curved liquid crystal display panel CLP is mounted.

The converter 930 may be configured in a printed circuit board on which a plurality of chips for providing power source to the curved liquid crystal display panel CLP or the backlight unit 910 is mounted.

The ADC 960 may convert an analog image signal provided from an external device (not shown) into a digital image data.

The SMPS 970 may provide the first and second heat sources 940 and 950 with a power for the first and second heat sources 940 and 950. The SMPS 970 may receive a commercial power to convert the commercial power into a power having a predetermined level and then may provide the first and second heat sources 940 and 950 with the power having the predetermined level. The SMPS 970 may convert a commercial power into a power having various levels such as 1.8 volts (V), 3 V and 5 V, for example. In such an embodiment, a power having a level of 1.8 V means an alternating power having 1.8 V as an effective value.

The first heat source 940 is disposed, e.g., attached, at a first side portion of a rear surface of the backlight unit 910 in correspondence with a portion where buckling occurs due to a bending of the curved liquid crystal display panel CLP. In one exemplary embodiment, for example, the first heat source 940 is disposed substantially parallel to a short side of the curved liquid crystal display panel CLP to emit heat. The emitted heat is provided to the curved liquid crystal display panel CLP to induce a temperature increase of a liquid crystal layer.

The second heat source 950 is disposed, e.g., attached, at a second side portion of the rear surface of the backlight unit 910 in correspondence with a portion where buckling occurs due to a bending of the curved liquid crystal display panel CLP. In one exemplary embodiment, for example, the second heat source 950 is disposed substantially parallel to a short side of the curved liquid crystal display panel CLP to emit heat. The emitted heat is provided to the curved liquid crystal display panel CLP to induce a temperature increase of a liquid crystal layer.

Grooves (not shown) may be further formed through a rear case 912, such that heat generated at each of the first and second heat sources 940 and 950 are effectively provided to the curved liquid crystal display panel CLP.

The temperature of a liquid crystal layer relatively near to the first heat source 940 is higher than the temperature of a liquid crystal layer relatively far from the first heat source 940. The temperature of a liquid crystal layer relatively near to the second heat source 950 is higher than the temperature of a liquid crystal layer relatively far from the second heat source 950. Thus, when a cell gap of a liquid crystal layer is increased in accordance with a portion where buckling occurs, a temperature of a corresponding portion is increased such that refractive index difference of a liquid crystal layer is decreased. Accordingly, the refractive index difference is decreased by the increasing of the cell gap, such that a phase difference of a liquid crystal layer is substantially uniformly maintained, and a yellowish image is effectively prevented from being generated.

As described above, according to an exemplary embodiment, a heat source that induces a temperature increase of a liquid crystal layer is disposed at a rear surface of a rear case of a curved liquid crystal display device and in an area where buckling occurs, thereby increasing the temperature of the liquid crystal layer corresponding to an area of the buckling to decrease a refractive index difference of the liquid crystal layer. Thus, a refractive index difference is decreased when a cell gap of the liquid crystal layer is increased due to a buckling, thereby effectively preventing display defects such as displaying a yellowish color to enhance display characteristics.

As described above, according to exemplary embodiments of the invention, a heating line that induces a temperature increase of a liquid crystal layer is disposed in an interior of a curved liquid crystal display panel and in an area where buckling occurs, thereby increasing the temperature of the liquid crystal layer corresponding to the area of the buckling to decrease a refractive index difference of the liquid crystal layer.

In exemplary embodiments, a heat source that induces a temperature increase of the liquid crystal layer is disposed at a rear surface of a backlight unit or a rear surface of a rear case of a curved liquid crystal display device and in an area where buckling occurs, thereby increasing the temperature of the liquid crystal layer corresponding to the area of the buckling to decrease a refractive index difference of the liquid crystal layer.

In exemplary embodiments, a refractive index difference of the liquid crystal layer is decreased when a cell gap of the liquid crystal layer is increased due to a buckling, thereby effectively preventing display defects such as displaying a yellowish color to enhance display characteristics. In such embodiments, the temperature of the liquid crystal layer is increased, thereby increasing a response speed of liquid crystal molecules.

While the invention has been particularly shown and described with reference to exemplary embodiments thereof, it is further noted that it is readily apparent to those of reasonable skill in the art that various modifications may be made without departing from the spirit and scope of the invention which is defined by the metes and bounds of the appended claims.

What is claimed is:

1. A curved liquid crystal display apparatus comprising:
an upper substrate having a curved shape;
a lower substrate having a curved shape;
a liquid crystal layer disposed between the upper substrate and the lower substrate, the liquid crystal layer having a curved shape;
a heating line disposed with at least one of the upper substrate and the lower substrate; and
a heat source providing part which provides a power to the heating line,
wherein the heating line is disposed on at least one of the upper substrate and the lower substrate corresponding to an area having an increased cell gap between the upper substrate and the lower substrate, and the area corresponding to having the liquid crystal layer in a display region which displays an image,
wherein the area having the increased cell gap results from buckling of the upper substrate independent and irrespective of any spacer or light shielding portion being present in the area, and
wherein the power provided to the heating line corresponding to the area having the increased cell gap is substantially greater than a power provided to the heating line corresponding to other areas where buckling does not occur.

2. The curved liquid crystal display apparatus of claim 1, wherein the heating line is disposed substantially uniformly on the lower substrate.

3. The curved liquid crystal display apparatus of claim 1, wherein the heating line is disposed on a portion of the lower substrate.

4. The curved liquid crystal display apparatus of claim 3, wherein the heating line is disposed in an area where buckling occurs when the upper substrate and the lower substrate are combined with each other and curved.

5. The curved liquid crystal display apparatus of claim 1, wherein the lower substrate comprises:
a pixel electrode; and
a data line which provides the pixel electrode with a data signal, and wherein a resistance of the heating line is greater than a resistance of the data line.

6. The curved liquid crystal display apparatus of claim 1, wherein the lower substrate comprises:
a pixel electrode; and
a data line which provides the pixel electrode with a data signal, and
wherein the heating line is substantially parallel to the data line.

7. The curved liquid crystal display apparatus of claim 1, wherein the lower substrate comprises:
a pixel electrode;
a switching element electrically connected to the pixel electrode;
a data line connected to an input terminal of the switching element; and
a gate line connected to a control terminal of the switching element, and
wherein the heating line is not overlapping the pixel electrode when viewed from a top view.

8. The curved liquid crystal display apparatus of claim 1, wherein the lower substrate comprises:
a pixel electrode;
a switching element electrically connected to the pixel electrode;
a data line connected to an input terminal of the switching element; and
a gate line connected to a control terminal of the switching element,
wherein the heating line is overlapping a portion of the pixel electrode when viewed from a top view.

9. The curved liquid crystal display apparatus of claim 1, wherein the lower substrate comprises:
a pixel electrode;
a switching element electrically connected to the pixel electrode;
a data line connected to an input terminal of the switching element; and
a gate line connected to a control terminal of the switching element, and
wherein the heating line is substantially parallel to the gate line.

10. The curved liquid crystal display apparatus of claim 1, wherein the lower substrate comprises:
a pixel electrode;
a switching element electrically connected to the pixel electrode;
a data line connected to an input terminal of the switching element; and
a gate line connected to a control terminal of the switching element, and
wherein the heating line comprises:
a vertical heating line substantially parallel to the data line; and
a horizontal heating line substantially parallel to the gate line.

11. The curved liquid crystal display apparatus of claim 1, wherein the lower substrate comprises:
a pixel electrode;
a switching element electrically connected to the pixel electrode;
a data line connected to an input terminal of the switching element; and
a gate line connected to a control terminal of the switching element, wherein the heating line comprises:
a vertical heating line substantially parallel to the data line; and
a horizontal heating line substantially parallel with the gate line, and
wherein the vertical and horizontal heating lines overlap a portion of the pixel electrode.

12. The curved liquid crystal display apparatus of claim 1, wherein the upper substrate comprises a black matrix layer, and
wherein the heating line is disposed on the upper substrate and overlapping the black matrix layer.

13. The curved liquid crystal display apparatus of claim 1, wherein the heating line increases the temperature of the liquid crystal layer such that a refractive index difference of the liquid crystal layer is decreased.

14. The curved liquid crystal display apparatus of claim 1, wherein the heating line provides heat to the liquid crystal layer such that a temperature of the liquid crystal layer increases.

15. A curved liquid crystal display device comprising:
a curved liquid crystal display panel comprising:
an upper substrate having a curved shape;
a liquid crystal layer having a curved shape;
a lower substrate which is combined with the upper substrate, the lower substrate having a curved shape, wherein the liquid crystal layer is disposed between the upper substrate and the lower substrate; and
a heating line disposed with at least one of the upper substrate and the lower substrate; and
a heat source providing part which provides a power to the heating line,
wherein the heating line is disposed on at least one of the upper substrate and the lower substrate corresponding to a first area having an increased cell gap between the upper substrate and the lower substrate, and the first area corresponding to having the liquid crystal layer in a display region which displays an image, and
wherein the power provided to the heating line corresponding to the first area is substantially greater than a power provided to the heating line corresponding to a second area where buckling does not occur.

16. The curved liquid crystal display device of claim 15, wherein
the heating line is disposed substantially uniformly on the lower substrate, and
the heat source providing part provides the heating line with powers different from each other.

17. The curved liquid crystal display device of claim 15, wherein
the curved liquid crystal display panel includes the first area where buckling occurs due to a bending of the curved liquid crystal display panel and the second area, and
the heating line is disposed on the first area of the curved liquid crystal display panel.

18. The curved liquid crystal display device of claim 15, wherein the curved liquid crystal display panel further comprises:
a pixel electrode;
a switching element electrically connected to the pixel electrode;
a data line connected to an input terminal of the switching element; and
a gate line connected to a control terminal of the switching element, and
wherein a resistance of the heating line is substantially greater than a resistance of the data line.

19. The curved liquid crystal display device of claim 15, wherein the curved liquid crystal display panel further comprises:
a pixel electrode; and
a data line which provides a data signal to the pixel electrode, and
wherein the heating line and the data line are substantially parallel to each other.

20. The curved liquid crystal display device of claim 15, wherein the curved liquid crystal display panel further comprises:
a pixel electrode;
a switching element electrically connected to the pixel electrode;
a data line connected to an input terminal of the switching element; and
a gate line connected to a control terminal of the switching element, and
wherein the heating line is disposed on an area not overlapping the pixel electrode when viewed from a top view.

21. The curved liquid crystal display device of claim 15, wherein the curved liquid crystal display panel further comprises:
a pixel electrode;
a switching element electrically connected to the pixel electrode;
a data line connected to an input terminal of the switching element; and
a gate line connected to a control terminal of the switching element, and
wherein the heating line is disposed overlapping a portion of the pixel electrode when viewed from a top view.

22. The curved liquid crystal display device of claim 15, wherein the curved liquid crystal display panel further comprises:
a pixel electrode;
a switching element electrically connected to the pixel electrode;
a data line connected to an input terminal of the switching element; and
a gate line connected to a control terminal of the switching element, and
wherein the heating line and the gate line are substantially parallel to each other.

23. The curved liquid crystal display device of claim 15, wherein the curved liquid crystal display panel further comprises:
a pixel electrode;
a switching element electrically connected to the pixel electrode;
a data line connected to an input terminal of the switching element; and
a gate line connected to a control terminal of the switching element, and
wherein the heating line comprises:
a vertical heating line substantially parallel to the data line; and
a horizontal heating line substantially parallel to the gate line.

24. The curved liquid crystal display device of claim 15, wherein the curved liquid crystal display panel further comprises:
- a pixel electrode;
- a switching element electrically connected to the pixel electrode;
- a data line connected to an input terminal of the switching element; and
- a gate line connected to a control terminal of the switching element, wherein the heating line comprises:
- a vertical heating line substantially parallel to the data line; and
- a horizontal heating line substantially parallel to the gate line, and wherein the vertical and horizontal heating lines overlap a portion of the pixel electrode.

25. The curved liquid crystal display device of claim 15, wherein
the upper substrate comprises a black matrix layer, and
the heating line is disposed on the upper substrate overlapping the black matrix layer.

26. The curved liquid crystal display device of claim 15, wherein the heating line provides heat to the liquid crystal layer such that a temperature of the liquid crystal layer increases.

* * * * *